United States Patent
Shubhi et al.

(10) Patent No.: US 12,395,998 B2
(45) Date of Patent: Aug. 19, 2025

(54) CONFIGURATION OF MINIMUM SCHEDULING OFFSETS

(71) Applicant: Telefonaktiebolaget LM Ericsson (publ), Stockholm (SE)

(72) Inventors: Ilmiawan Shubhi, Malmö (SE); Ajit Nimbalker, Fremont, CA (US); Ravikiran Nory, San José, CA (US); Sina Maleki, Malmö (SE); Andres Reial, Höllviken (SE)

(73) Assignee: Telefonaktiebolaget LM Ericsson (Publ), Stockhom (SE)

( * ) Notice: Subject to any disclaimer, the term of this patent is extended or adjusted under 35 U.S.C. 154(b) by 379 days.

(21) Appl. No.: 17/774,359

(22) PCT Filed: Nov. 9, 2020

(86) PCT No.: PCT/EP2020/081525
§ 371 (c)(1),
(2) Date: May 4, 2022

(87) PCT Pub. No.: WO2021/089876
PCT Pub. Date: May 14, 2021

(65) Prior Publication Data
US 2022/0386352 A1    Dec. 1, 2022

Related U.S. Application Data

(60) Provisional application No. 62/933,066, filed on Nov. 8, 2019.

(51) Int. Cl.
*H04L 5/00* (2006.01)
*H04W 72/23* (2023.01)

(52) U.S. Cl.
CPC ............. *H04W 72/23* (2023.01); *H04L 5/001* (2013.01)

(58) Field of Classification Search
CPC .................................................. H04W 72/23
See application file for complete search history.

(56) References Cited

U.S. PATENT DOCUMENTS

| 11,611,977 B2* | 3/2023 | Seo ......................... H04L 5/001 |
| 11,963,189 B2* | 4/2024 | Yi .......................... H04L 5/0044 |

(Continued)

FOREIGN PATENT DOCUMENTS

| WO | WO-2020222208 A1 * | 11/2020 | ............ H04W 72/21 |
| WO | WO-2021207391 A1 * | 10/2021 | ........... H04L 1/1671 |

OTHER PUBLICATIONS

International Search Report and Written Opinion dated Feb. 5, 2021 for International Application No. PCT/EP2020/081525 filed Nov. 9, 2020; consisting of 21 pages.

(Continued)

*Primary Examiner* — Shukri Taha
(74) *Attorney, Agent, or Firm* — Weisberg I.P. Law, P.A.

(57) ABSTRACT

Methods and apparatuses are disclosed for minimum scheduling offset interpretation. In one embodiment, the network node is configured receive an indication of a first preferred value for a minimum scheduling offset for a first bandwidth part, BWP, having a first subcarrier spacing, SCS, and a second preferred value for a minimum scheduling offset for a second bandwidth part, BWP, having a second subcarrier spacing, SCS; determine a minimum scheduling offset parameter for at least one of the first BWP having the first SCS and the second BWP having the second SCS based at least in part on at least one of the first preferred value and the second preferred value; and configure the wireless device with the determined minimum scheduling offset parameter. In another embodiment, a wireless device is configured to indicate the first and second preferred values.

22 Claims, 11 Drawing Sheets

(56) References Cited

U.S. PATENT DOCUMENTS

| | | | | |
|---|---|---|---|---|
| 2021/0050985 | A1* | 2/2021 | Ang | H04W 72/0446 |
| 2022/0167193 | A1* | 5/2022 | Kim | H04W 72/044 |
| 2022/0346068 | A1* | 10/2022 | Nimbalker | H04W 72/23 |

OTHER PUBLICATIONS

3GPP TSG-RAN WG1 Meeting #99 Tdoc R1-1912781; Title: Procedure for Cross-Slot Scheduling Enhancement; Agenda Item: 7.2.9.1; Source: Ericsson; Document for: Discussion and Decision; Date and Location: Nov. 18-22, 2019, Reno, USA; consisting of 10 pages.

3GPP TSG-RAN WG1 #98bis R1-1911130; Title: Cross-slot scheduling power saving techniques; Agenda item: 7.2.9.2; Source: Qualcomm Incorporated; Document for: Discussion/Decision; Date and Location: Oct. 14-20, 2019, Chongqing, China; consisting of 18 pages.

3GPP TSG RAN WG1 #98bis R1-1910234; Title: Remaining aspects of cross-slot scheduling power saving techniques; Source: vivo; Agenda Item: 7.2.9.2; Document for: Discussion and Decision; Date and Location: Oct. 14-20, 2019, Chongqing, China; consisting of 6 pages.

3GPP TSG RAN WG1 meeting #98bis R1-1911246; Title: Procedure of cross-slot scheduling power saving techniques; Agenda item: 7.2.9.2; Source: Nokia, Nokia Shanghai Bell; Document for: Discussion and Decision; Date and Location: Oct. 14-20, 2019, Chongqing, China; consisting of 6 pages.

3GPP TSG RAN WG1 #98b R1-1910973; Title: Cross Slot Scheduling Design for UE Power Saving; Agenda Item: 7.2.9.2; Source: Apple Inc.; Document for: Discussion, Decision; Date and Location: Oct. 14-18, 2019, Chongqing, China; consisting of 8 pages.

* cited by examiner

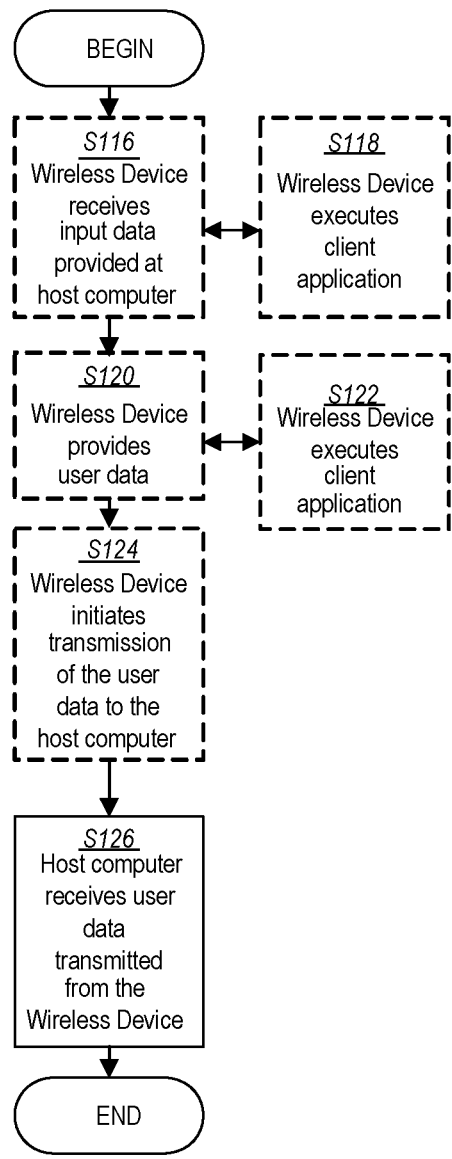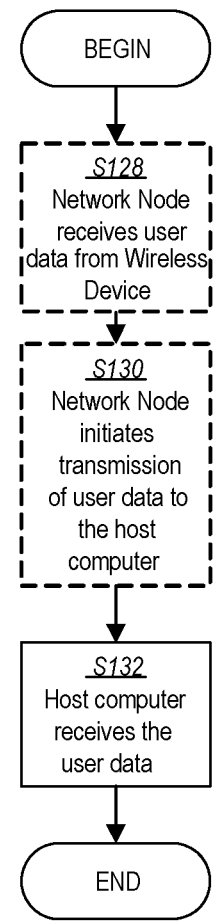
FIG. 8
FIG. 9

CONFIGURATION OF MINIMUM SCHEDULING OFFSETS

CROSS-REFERENCE TO RELATED APPLICATIONS

This application is a Submission Under 35 U.S.C. § 371 for U.S. National Stage Patent Application of International Application No.: PCT/EP2020/081525, filed Nov. 9, 2020 entitled "CONFIGURATION OF MINIMUM SCHEDULING OFFSETS," which claims priority to U.S. Provisional Application No. 62/933,066, filed Nov. 8, 2019, entitled "METHODS FOR MINIMUM SCHEDULING OFFSET INTERPRETATION," the entireties of both of which are incorporated herein by reference.

TECHNICAL FIELD

The present disclosure relates to wireless communications, and in particular, to configuring minimum scheduling offsets.

BACKGROUND

One of the power-consuming activities of wireless devices (WDs), such as user equipments (UEs), in an RRC_CONNECTED mode, is monitoring the physical downlink control channel (PDCCH). Considering this, PDCCH monitoring should be conducted in an efficient manner. One of the methods of performing an effective PDCCH monitoring is by setting the scheduling to the cross-slot mode. When cross-slot scheduling is used, the WD may not perform the physical downlink shared channel (PDSCH) buffering after the last symbol of the PDCCH and may go to microsleep earlier in the respective slot. Note that as used herein, the PDSCH is used as an example and the same condition/procedure may also apply when PDCCH schedules other channels/transmissions, such as, physical uplink shared channel (PUSCH), aperiodic channel state information reference signal (CSI-RS), or aperiodic sounding reference signal (SRS).

In order to obtain the power-saving gain offered by cross-slot scheduling, however, the WD may have to know in advance that cross-slot scheduling may be used by the network node (NW). Otherwise, the WD still performs the PDSCH buffering as the WD can only know the slot offset, K0, value after the PDCCH decoding finishes. FIG. 1 illustrates an example arrangement in which a WD may not go to microsleep directly after PDCCH reception if it does not know in advance that the PDSCH will be scheduled in the next slot.

In Third Generation Partnership Project (3GPP) Release 16 (Rel-16), the minimumSchedulingOffset parameter may be introduced and it is configured in radio resource control (RRC). When this parameter is configured with a value more than 0, the WD may know in advance that it will be scheduling by using cross-slot scheduling, with a specified minimum delay between PDCCH and PDSCH, and thus, the benefit of cross-slot scheduling for power-saving can be obtained. FIG. 2 illustrates an example arrangement in which a WD may go to microsleep directly after PDCCH reception if the WD knows in advance (e.g., via minimumSchedulingOffset parameter configuration) that the PDSCH will be scheduled in the next slot.

To obtain even more efficient power-saving, 3GPP Rel-16 also supports WD-assistance to let the WD inform the network node of its preferred minimumSchedulingOffset. The value of the preferred minimumSchedulingOffset may be in a certain range and the WD can send a value for each subcarrier spacing (SCS).

SUMMARY

Some embodiments advantageously provide methods, systems, and apparatuses for minimum scheduling offset interpretation.

Methods and apparatuses are disclosed for minimum scheduling offset interpretation. In one embodiment, the network node is configured to receive, from the wireless device, an indication of a preferred value for a minimum scheduling offset for each subcarrier spacing (SCS) associated with at least one scheduling component carrier (CC) and/or at least one scheduled CC; use at least the preferred value to determine a value of a minimum scheduling offset parameter; and configure the wireless device with the determined value of the minimum scheduling offset parameter.

In another embodiment, a wireless device is configured to indicate a preferred value for a minimum scheduling offset for each subcarrier spacing (SCS) associated with at least one scheduling component carrier (CC) and/or at least one scheduled CC; and receive a configuration indicating a value of a minimum scheduling offset parameter, the value of the configured minimum scheduling offset parameter based at least in part on the indicated preferred value.

According to an aspect of the present disclosure, a method implemented in a network node configured to communicate with a wireless device using cross-slot scheduling is provided. The method includes receiving an indication of a first preferred value for a minimum scheduling offset for a first bandwidth part, BWP, having a first subcarrier spacing, SCS, and a second preferred value for a minimum scheduling offset for a second bandwidth part, BWP, having a second subcarrier spacing, SCS; determining a minimum scheduling offset parameter for at least one of the first BWP having the first SCS and the second BWP having the second SCS based at least in part on at least one of the first preferred value and the second preferred value; and configuring the wireless device with the determined minimum scheduling offset parameter.

In some embodiments of this aspect, the first SCS is associated with the first BWP of a scheduling component carrier, CC, and the second SCS is associated with the second BWP of a scheduled CC. In some embodiments of this aspect, the scheduling CC and the scheduled CC are a same CC. In some embodiments of this aspect, the scheduling CC and the scheduled CC are different CCs. In some embodiments of this aspect, the first BWP and the second BWP are a same BWP. In some embodiments of this aspect, the first BWP and the second BWP are different BWPs. In some embodiments of this aspect, determining the minimum scheduling offset parameter comprises determining the minimum scheduling offset parameter for the second BWP of the scheduled CC having the second SCS.

In some embodiments of this aspect, determining the minimum scheduling offset parameter comprises determining the minimum scheduling offset parameter based at least in part on whether the first SCS associated with the first BWP of the scheduling CC and the second SCS associated with the second BWP of the scheduled CC are a same. In some embodiments of this aspect, determining the minimum scheduling offset parameter comprises using one of the first preferred value and the second preferred value as the minimum scheduling offset parameter when the first SCS associated with the BWP of the scheduling CC and the second SCS associated with the BWP of the scheduled CC are the same.

In some embodiments of this aspect, determining the minimum scheduling offset parameter comprises determining the minimum scheduling offset parameter based at least in part on whether the first SCS associated with the first BWP of the scheduling CC and the second SCS associated with the second BWP of the scheduled CC are different. In some embodiments of this aspect, determining the minimum scheduling offset parameter for the second BWP of the scheduled CC associated with the second SCS from: the first and second preferred values; the first and second SCSs; and a limiting factor, L, denoting a maximum allowed scheduling offset for the second BWP of the scheduled CC having the second SCS.

In some embodiments of this aspect, determining the minimum scheduling offset parameter comprises determining the minimum scheduling offset parameter using a ratio between the second SCS and the first SCS. In some embodiments of this aspect, the minimum scheduling offset parameter is determined using a multiplication of the first preferred value for the first SCS with the ratio between the second SCS and the first SCS. In some embodiments of this aspect, determining the minimum scheduling offset parameter comprises determining the minimum scheduling offset parameter based at least in part on a physical downlink control channel, PDCCH, monitoring case.

In some embodiments of this aspect, determining the minimum scheduling offset parameter comprises setting a parameter, a, to a first value when a first PDCCH monitoring case is used to cross-slot schedule the wireless device; and setting the parameter a to a second value when a second PDDCH monitoring case is used to cross-slot schedule the wireless device, the minimum scheduling offset parameter being based further on the parameter a. In some embodiments of this aspect, determining the minimum scheduling offset parameter comprises determining the minimum scheduling offset parameter based at least in part on a last physical downlink control channel, PDCCH, symbol within a slot.

In some embodiments of this aspect, determining the minimum scheduling offset parameter comprises calculating the minimum scheduling offset parameter, k, for the second BWP of the scheduled CC having the second SCS, $\mu_M$, according to:

$$K^{\mu_M} = \min\left(\max_{x \in X}\left(\left\lceil (K_{\mu_x} + \alpha)\frac{\mu_M}{\mu_x} \right\rceil\right), L\right),$$

where $K_{\mu_x}$ represents at least one of the first preferred value and the second preferred value; $\mu_x$ represents the first SCS of the scheduling CC; α represents a parameter based on a physical downlink control channel, PDCCH, monitoring case; X represents all numerologies included in the scheduling CC; and L represents a maximum allowed scheduling offset for the second BWP of the scheduled CC having the second SCS.

In some embodiments of this aspect, determining the minimum scheduling offset parameter comprises determining the minimum scheduling offset parameter based at least in part on a maximum allowed scheduling offset value. In some embodiments of this aspect, configuring the wireless device further comprises configuring the wireless device with the determined minimum scheduling offset parameter via radio resource control, RRC, signaling. In some embodiments of this aspect, the method further includes performing cross-carrier scheduling for the wireless device; and receiving and/or transmitting signaling based at least in part on the cross-carrier scheduling and the determined minimum scheduling offset parameter.

According to another aspect of the present disclosure, a method implemented in a wireless device configured to communicate with a network node according to cross-slot scheduling is provided. The method includes indicating a first preferred value for a minimum scheduling offset for a first bandwidth part, BWP, having a first subcarrier spacing, SCS, and a second preferred value for a second bandwidth part, BWP, having a minimum scheduling offset for a second subcarrier spacing, SCS; and receiving a configuration indicating a minimum scheduling offset parameter for at least one of the first BWP having the first SCS and the second BWP having the second SCS, the minimum scheduling offset parameter being based at least in part on at least one of the first preferred value and the second preferred value.

In some embodiments of this aspect, the first SCS is associated with the first BWP of a scheduling component carrier, CC, and the second SCS is associated with the second BWP of a scheduled CC. In some embodiments of this aspect, the scheduling CC and the scheduled CC are a same CC. In some embodiments of this aspect, the scheduling CC and the scheduled CC are different CCs. In some embodiments of this aspect, the first BWP and the second BWP are a same BWP. In some embodiments of this aspect, the first BWP and the second BWP are different BWPs. In some embodiments of this aspect, determining the minimum scheduling offset parameter comprises determining the minimum scheduling offset parameter for the second BWP of the scheduled CC having the second SCS.

In some embodiments of this aspect, the minimum scheduling offset parameter is further based at least in part on whether the first SCS associated with the first BWP of the scheduling CC and the second SCS associated with the second BWP of the scheduled CC are a same. In some embodiments of this aspect, the minimum scheduling offset parameter is equal to one of the first preferred value and the second preferred value when the first SCS associated with the first BWP of the scheduling CC and the second SCS associated with the second BWP of the scheduled CC are the same. In some embodiments of this aspect, the minimum scheduling offset parameter is further based at least in part on whether the first SCS associated with the first BWP of the scheduling CC and the second SCS associated with the second BWP of the scheduled CC are different.

In some embodiments of this aspect, determining the minimum scheduling offset parameter for the second BWP of the scheduled CC associated with the second SCS from: the first and second preferred values; the first and second SCSs; and a limiting factor, L, denoting a maximum allowed scheduling offset for the second BWP of the scheduled CC having the second SCS. In some embodiments of this aspect, the minimum scheduling offset parameter is further based at least in part on a ratio between the second SCS and the first SCS. In some embodiments of this aspect, the minimum scheduling offset parameter is further based at least in part on a multiplication of the first preferred value for the first SCS with the ratio between the second SCS and the first SCS.

In some embodiments of this aspect, the minimum scheduling offset parameter is further based at least in part on a physical downlink control channel, PDCCH, monitoring case. In some embodiments of this aspect, the minimum scheduling offset parameter is further based at least in part on a last physical downlink control channel, PDCCH, symbol within a slot. In some embodiments of this aspect, the minimum scheduling offset parameter is further based at least in part on a calculation of the minimum scheduling offset parameter, k, for the second BWP of the scheduled CC having the second SCS, $\mu_M$, according to:

$$K^{\mu_M} = \min\left(\max_{x \in X}\left(\left\lceil (K_{\mu_x} + \alpha)\frac{\mu_M}{\mu_x} \right\rceil\right), L\right),$$

where $K_{\mu x}$ represents at least one of the first preferred value and the second preferred value; $\mu_x$ represents the first SCS of the scheduling CC; α represents a parameter based on a physical downlink control channel, PDCCH, monitoring case; X represents all numerologies included in the scheduling CC; and L representing a maximum allowed scheduling offset for the second BWP of the scheduled CC having the second SCS.

In some embodiments of this aspect, the minimum scheduling offset parameter is further based at least in part on a maximum allowed scheduling offset value. In some embodiments of this aspect, receiving the configuration further comprises receiving the minimum scheduling offset parameter via radio resource control, RRC, signaling. In some embodiments of this aspect, the method further includes receiving a cross-carrier scheduling; and receiving and/or transmitting signaling based at least in part on the cross-carrier scheduling and the minimum scheduling offset parameter.

According to yet another aspect of the present disclosure, a network node configured to communicate with a wireless device using cross-slot scheduling is provided. The network node includes processing circuitry. The processing circuitry is configured to cause the network node to receive an indication of a first preferred value for a minimum scheduling offset for a first bandwidth part, BWP, having a first subcarrier spacing, SCS, and a second preferred value for a minimum scheduling offset for a second bandwidth part, BWP, having a second subcarrier spacing, SCS; determine a minimum scheduling offset parameter for at least one of the first BWP having the first SCS and the second BWP having the second SCS based at least in part on at least one of the first preferred value and the second preferred value; and configure the wireless device with the determined minimum scheduling offset parameter.

In some embodiments of this aspect, the first SCS is associated with the first BWP of a scheduling component carrier, CC, and the second SCS is associated with the second BWP of a scheduled CC. In some embodiments of this aspect, the scheduling CC and the scheduled CC are a same CC. In some embodiments of this aspect, the scheduling CC and the scheduled CC are different CCs. In some embodiments of this aspect, the first BWP and the second BWP are a same BWP. In some embodiments of this aspect, the first BWP and the second BWP are different BWPs. In some embodiments of this aspect, the processing circuitry is configured to cause the network node to determine the minimum scheduling offset parameter by being configured to determine the minimum scheduling offset parameter for the second BWP of the scheduled CC having the second SCS.

In some embodiments of this aspect, the processing circuitry is configured to cause the network node to determine the minimum scheduling offset parameter by being configured to cause the network node to: determine the minimum scheduling offset parameter based at least in part on whether the first SCS associated with the first BWP of the scheduling CC and the second SCS associated with the second BWP of the scheduled CC are a same. In some embodiments of this aspect, the processing circuitry is configured to cause the network node to determine the minimum scheduling offset parameter by being configured to cause the network node to: use one of the first preferred value and the second preferred value as the minimum scheduling offset parameter when the first SCS associated with the BWP of the scheduling CC and the second SCS associated with the BWP of the scheduled CC are the same.

In some embodiments of this aspect, the processing circuitry is configured to cause the network node to determine the minimum scheduling offset parameter by being configured to cause the network node to: determine the minimum scheduling offset parameter based at least in part on whether the first SCS associated with the first BWP of the scheduling CC and the second SCS associated with the second BWP of the scheduled CC are different. In some embodiments of this aspect, the processing circuitry is configured to cause the network node to determine the minimum scheduling offset parameter for the second BWP of the scheduled CC associated with the second SCS from: the first and second preferred values; the first and second SCSs; and a limiting factor, L, denoting a maximum allowed scheduling offset for the second BWP of the scheduled CC having the second SCS.

In some embodiments of this aspect, the processing circuitry is configured to cause the network node to determine the minimum scheduling offset parameter by being configured to cause the network node to: determine the minimum scheduling offset parameter using a ratio between the second SCS and the first SCS. In some embodiments of this aspect, the processing circuitry is configured to cause the network node to determine the minimum scheduling offset parameter by being configured to cause the network node to determine the minimum scheduling offset parameter using a multiplication of the first preferred value for the first SCS with the ratio between the second SCS and the first SCS.

In some embodiments of this aspect, the processing circuitry is configured to cause the network node to determine the minimum scheduling offset parameter by being configured to cause the network node to: determine the minimum scheduling offset parameter based at least in part on a physical downlink control channel, PDCCH, monitoring case. In some embodiments of this aspect, the processing circuitry is configured to cause the network node to determine the minimum scheduling offset parameter by being configured to cause the network node to: set a parameter, a, to a first value when a first PDCCH monitoring case is used to cross-slot schedule the wireless device; and set the parameter a to a second value when a second PDDCH monitoring case is used to cross-slot schedule the wireless device, the minimum scheduling offset parameter being based further on the parameter a.

In some embodiments of this aspect, the processing circuitry is configured to cause the network node to determine the minimum scheduling offset parameter by being configured to cause the network node to: determine the minimum scheduling offset parameter based at least in part on a last physical downlink control channel, PDCCH, symbol within a slot. In some embodiments of this aspect, the processing circuitry is configured to cause the network node to determine the minimum scheduling offset parameter by being configured to cause the network node to: calculate the minimum scheduling offset parameter, k, for the second BWP of the scheduled CC having the second SCS, $\mu_M$, according to:

$$K^{\mu_M} = \min\left(\max_{x \in X}\left(\left\lceil (K_{\mu_x} + \alpha)\frac{\mu_M}{\mu_x}\right\rceil\right), L\right),$$

where $K_{\mu x}$ represents at least one of the first preferred value and the second preferred value; $\mu_x$ represents the first SCS of the scheduling CC; $\alpha$ represents a parameter based on a physical downlink control channel, PDCCH, monitoring case; X represents all numerologies included in the scheduling CC; and L represents a maximum allowed scheduling offset for the second BWP of the scheduled CC having the second SCS.

In some embodiments of this aspect, the processing circuitry is configured to cause the network node to determine the minimum scheduling offset parameter by being configured to cause the network node to: determine the minimum scheduling offset parameter based at least in part on a maximum allowed scheduling offset value. In some embodiments of this aspect, the processing circuitry is configured to cause the network node to configure the wireless device with the determined minimum scheduling offset parameter via radio resource control, RRC, signaling. In some embodiments of this aspect, the processing circuitry is further configured to cause the network node to: perform cross-carrier scheduling for the wireless device; and receive and/or transmit signaling based at least in part on the cross-carrier scheduling and the determined minimum scheduling offset parameter.

According to another aspect of the present disclosure, a wireless device configured to communicate with a network node according to cross-slot scheduling is provided. The wireless device comprising processing circuitry, the processing circuitry configured to cause the wireless device to: indicate a first preferred value for a minimum scheduling offset for a first bandwidth part, BWP, having a first subcarrier spacing, SCS, and a second preferred value for a second bandwidth part, BWP, having a minimum scheduling offset for a second subcarrier spacing, SCS; and receive a configuration indicating a minimum scheduling offset parameter for at least one of the first BWP having the first SCS and the second BWP having the second SCS, the minimum scheduling offset parameter being based at least in part on at least one of the first preferred value and the second preferred value.

In some embodiments of this aspect, the first SCS is associated with the first BWP of a scheduling component carrier, CC, and the second SCS is associated with the second BWP of a scheduled CC. In some embodiments of this aspect, the scheduling CC and the scheduled CC are a same CC. In some embodiments of this aspect, the scheduling CC and the scheduled CC are different CCs. In some embodiments of this aspect, the first BWP and the second BWP are a same BWP. In some embodiments of this aspect, the first BWP and the second BWP are different BWPs. In some embodiments of this aspect, the processing circuitry is configured to cause the wireless device to determine the minimum scheduling offset parameter by being configured to cause the wireless device to determine the minimum scheduling offset parameter for the second BWP of the scheduled CC having the second SCS.

In some embodiments of this aspect, the minimum scheduling offset parameter is further based at least in part on whether the first SCS associated with the first BWP of the scheduling CC and the second SCS associated with the second BWP of the scheduled CC are a same. In some embodiments of this aspect, the minimum scheduling offset parameter is equal to one of the first preferred value and the second preferred value when the first SCS associated with the first BWP of the scheduling CC and the second SCS associated with the second BWP of the scheduled CC are the same. In some embodiments of this aspect, the minimum scheduling offset parameter is further based at least in part on whether the first SCS associated with the first BWP of the scheduling CC and the second SCS associated with the second BWP of the scheduled CC are different.

In some embodiments of this aspect, the processing circuitry is configured to cause the wireless device to determine the minimum scheduling offset parameter for the second BWP of the scheduled CC associated with the second SCS from: the first and second preferred values; the first and second SCSs; and a limiting factor, L, denoting a maximum allowed scheduling offset for the second BWP of the scheduled CC having the second SCS. In some embodiments of this aspect, the minimum scheduling offset parameter is further based at least in part on a ratio between the second SCS and the first SCS. In some embodiments of this aspect, the minimum scheduling offset parameter is further based at least in part on a multiplication of the first preferred value for the first SCS with the ratio between the second SCS and the first SCS.

In some embodiments of this aspect, the minimum scheduling offset parameter is further based at least in part on a physical downlink control channel, PDCCH, monitoring case. In some embodiments of this aspect, the minimum scheduling offset parameter is further based at least in part on a last physical downlink control channel, PDCCH, symbol within a slot. In some embodiments of this aspect, the minimum scheduling offset parameter is further based at least in part on a calculation of the minimum scheduling offset parameter, k, for the second BWP of the scheduled CC having the second SCS, $\mu_M$, according to:

$$K^{\mu_M} = \min\left(\max_{x \in X}\left(\left\lceil (K_{\mu_x} + \alpha)\frac{\mu_M}{\mu_x}\right\rceil\right), L\right),$$

where $K_{\mu x}$ represents at least one of the first preferred value and the second preferred value; $\mu_x$ represents the first SCS of the scheduling CC; $\alpha$ represents a parameter based on a physical downlink control channel, PDCCH, monitoring case; X represents all numerologies included in the scheduling CC; and L representing a maximum allowed scheduling offset for the second BWP of the scheduled CC having the second SCS.

In some embodiments of this aspect, the minimum scheduling offset parameter is further based at least in part on a maximum allowed scheduling offset value. In some embodiments of this aspect, the processing circuitry is configured to cause the wireless device to receive the configuration by being configured to cause the wireless device to receive the minimum scheduling offset parameter via radio resource control, RRC, signaling. In some embodiments of this aspect, the processing circuitry is configured to cause the wireless device to: receive a cross-carrier scheduling; and receive and/or transmit signaling based at least in part on the cross-carrier scheduling and the minimum scheduling offset parameter.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

DETAILED DESCRIPTION

In 3GPP Rel-16, the number preferred for the parameter minimumSchedulingOffset that can be sent by the WD to the network node is limited to one value per SCS, which may be under the same-numerology scheduling assumption. Here, the same-numerology scheduling can be in terms of the same-carrier scheduling or cross-carrier scheduling with the same numerology of the scheduling component carrier (CC) and the scheduled CC.

Figure 1:
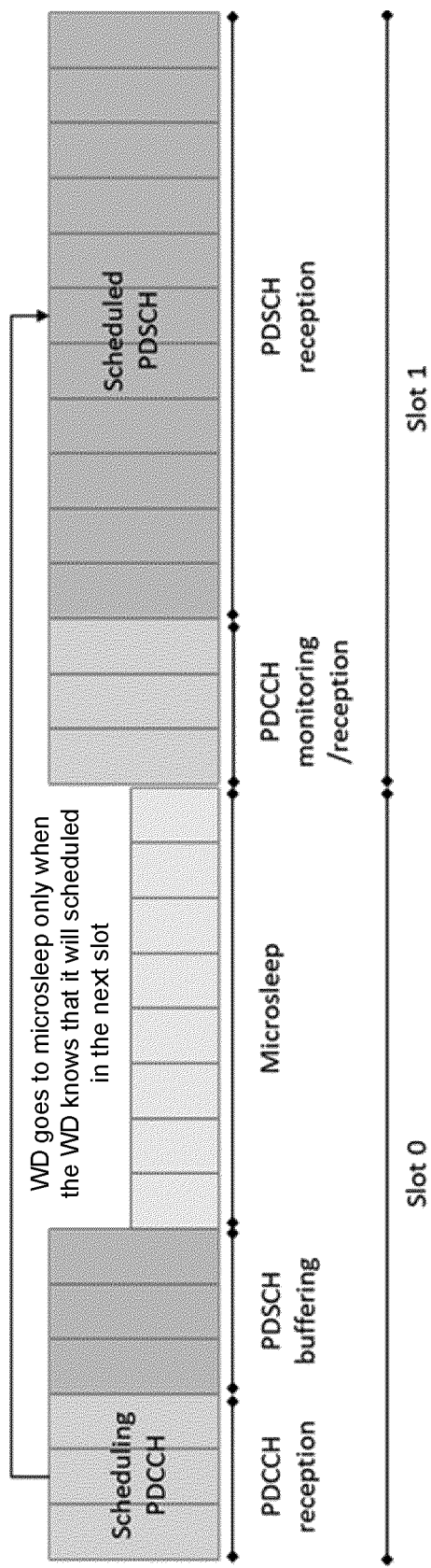
FIG. 1 illustrates an example arrangement in which a WD may not go to microsleep directly after PDCCH reception if it does not know in advance that the PDSCH will be scheduled in the next slot.
Figure 2:
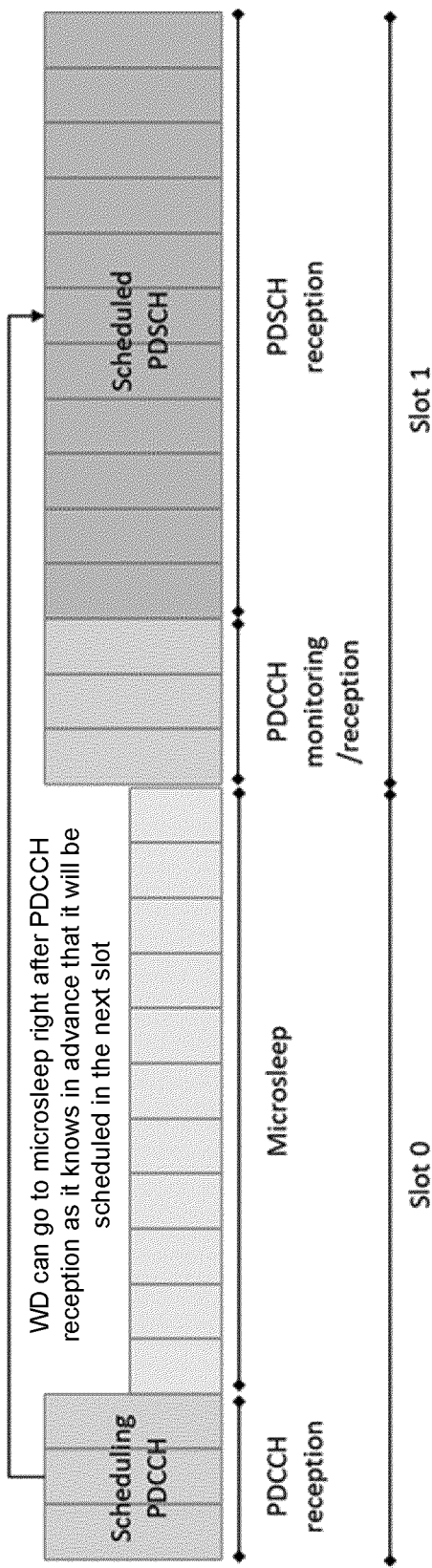
FIG. 2 illustrates an example arrangement in which a WD may go to microsleep directly after PDCCH reception if it knows in advance that the PDSCH will be scheduled in the next slot.
Figure 3:
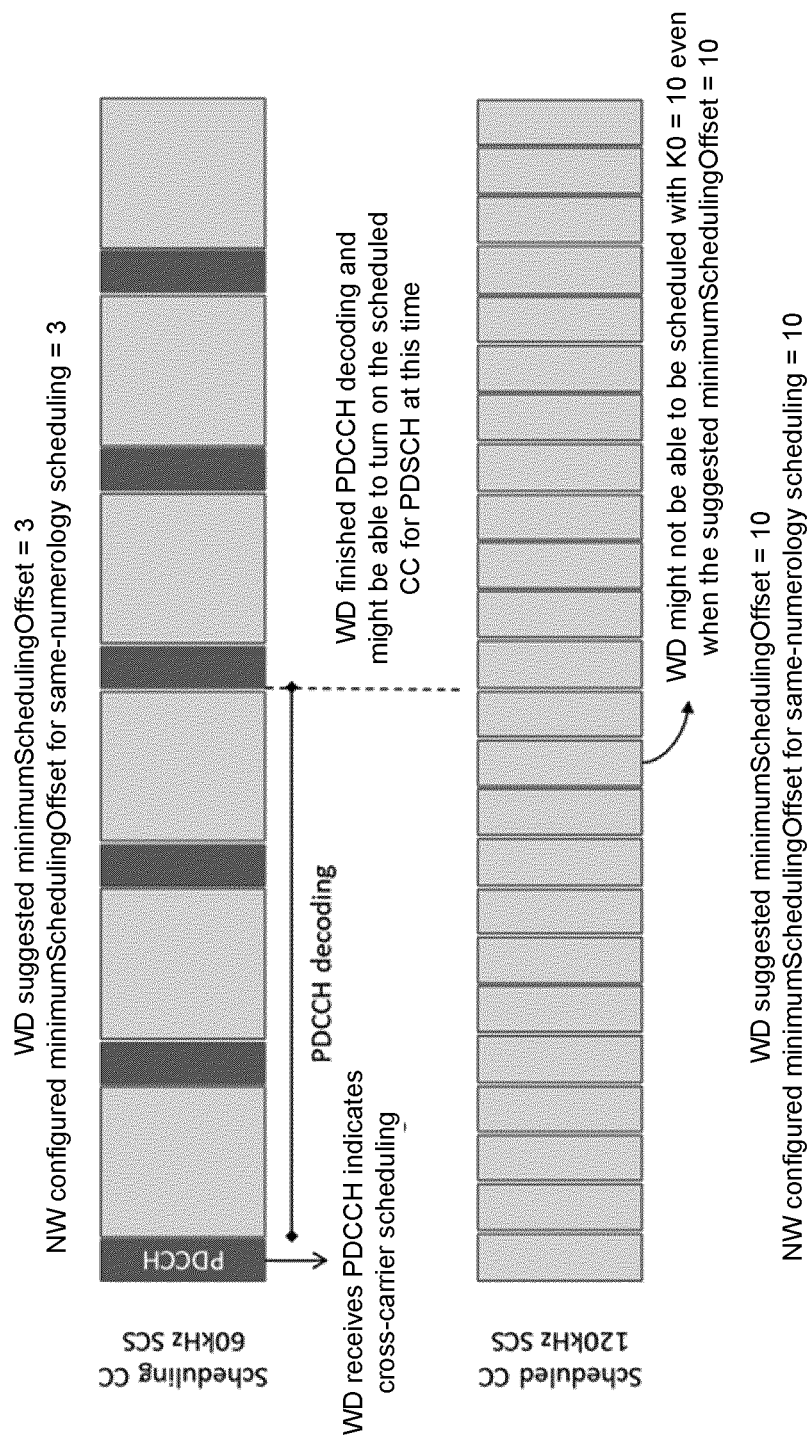
FIG. 3 illustrates an example problematic arrangement with mixed numerology scheduling.

In the implementation, however, it is possible for the network node to schedule the WD using cross-carrier scheduling with a mixed numerology, i.e., the scheduling CC and the scheduled CC has different numerologies (thus, different SCS). Due to different symbol lengths and/or PDCCH positions in the slot, in addition to or in relation to the PDCCH decoding time, the WD processing and PDSCH reception preparation delay may be higher than the corresponding value for the same numerology. In this case, the WD may not be able to handle, and the network node could not directly use, a scheduling offset according to the minimumSchedulingOffset suggested by the WD for that particular SCS. The problem may be particularly problematic in mixed numerology scheduling. FIG. 3 illustrates one example of this problem.

Considering this, methods to interpret and configure the minimumSchedulingOffset for a scheduled cell bandwidth part (BWP) may be beneficial. Some embodiments of the present disclosure provide arrangements to interpret and to configure the minimumSchedulingOffset for the BWP of the scheduled CC.

Specifically, according to one aspect of the present disclosure, criteria and approaches that are considered by the network node to interpret the minimumSchedulingOffset value are described. According to another aspect of the present disclosure, arrangements for how to configure the minimumSchedulingOffset for a scheduled CC BWP are described. Some arrangements address both same- and mixed-numerology scheduling scenarios.

Using some embodiments provided in the present disclosure, a more robust configuration on the minimumSchedulingOffset for scheduled CC BWP can be achieved, and thus avoid the case in which the WD may miss the PDSCH even when the KO value in the downlink control information (DCI) is equal to or larger than the minimumSchedulingOffset suggested by the WD for a particular SCS.

Before describing in detail exemplary embodiments, it is noted that the embodiments reside primarily in combinations of apparatus components and processing steps related to minimum scheduling offset interpretation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "preferred value" is used and may be used to indicate a value suggested or indicated by the wireless device (but which is ultimately determined and configured by the network node).

In some embodiments, the offset value discussed herein may be a slot offset value representing a number of slots. In other embodiments, the offset value may be based on another time resource (e.g., symbol, mini-slot, etc.).

Some embodiments of the present disclosure relate to cross-slot scheduling. As known in the art, in cross-slot scheduling, a WD may receive control information (e.g., PDCCH, DCI) in one slot, while the data information (e.g., PDSCH, PUSCH) indicated by the control information (e.g., scheduling DCI) is scheduled in a different slot.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "numerology" herein may comprise, e.g., any one or more of: frame duration, subframe or TTI duration, slot or minislot duration, symbol duration and the number of symbols per slot and subframe, subcarrier spacing, sampling frequency, Fast Fourier Transform (FFT) size, number of subcarriers per RB and RB bandwidth, number of RBs within a bandwidth, symbols per subframe, CP length, etc. The numerology determines the grid of REs in time and/or frequency domain.

Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., an RRC minimum scheduling offset parameter). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., an indication of a minimum scheduling offset value, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide methods and devices for minimum scheduling offset interpretation.

Figure 4:
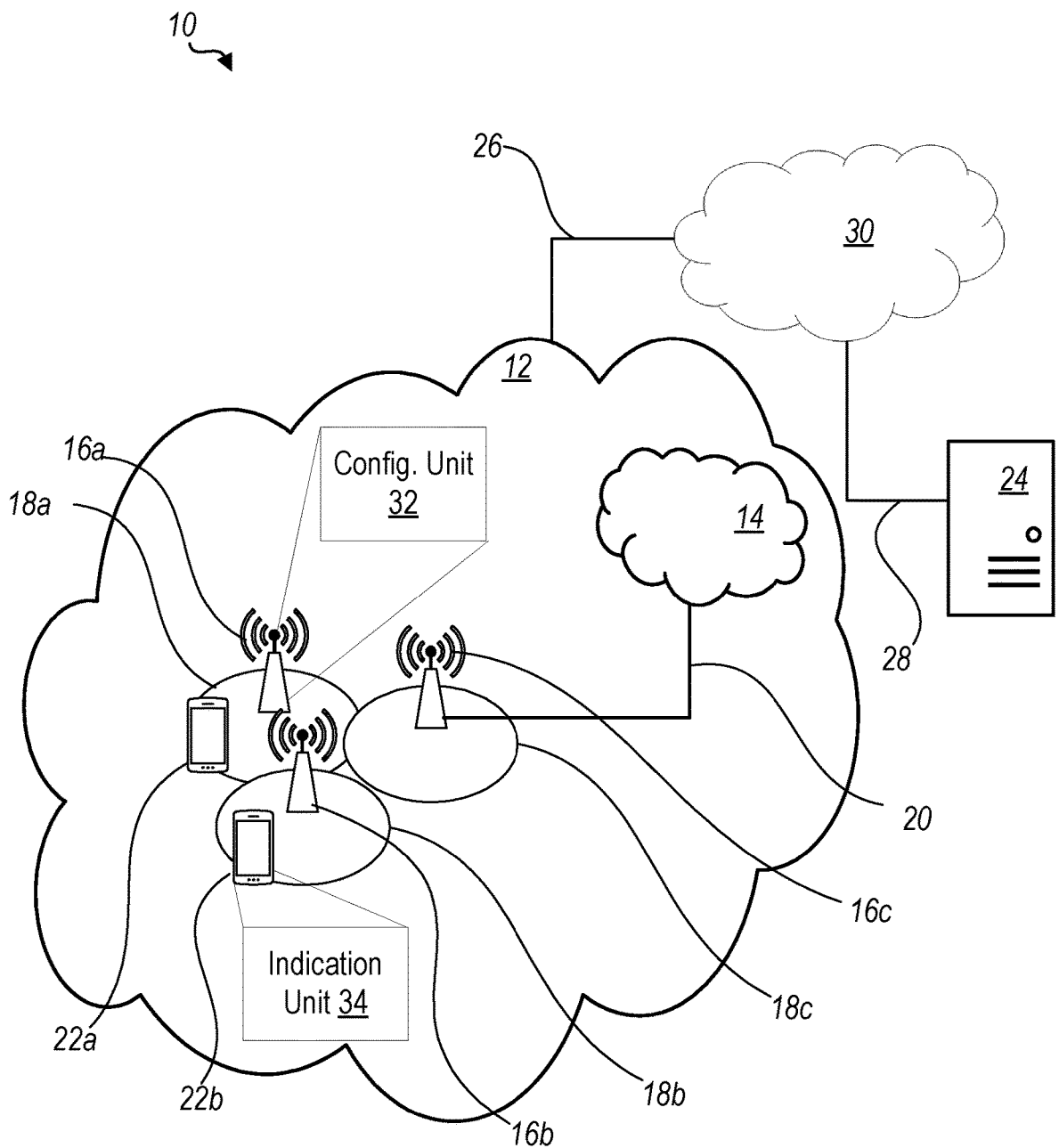
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to receive, from the wireless device, an indication of a preferred value for a minimum scheduling offset for each subcarrier spacing (SCS) associated with at least one scheduling component carrier (CC) and/or at least one scheduled CC; use at least the preferred value to determine a value of a minimum scheduling offset parameter; and configure the wireless device with the determined value of the minimum scheduling offset parameter.

A wireless device 22 is configured to include an indication unit 34 which is configured to indicate a preferred value for a minimum scheduling offset for each subcarrier spacing (SCS) associated with at least one scheduling component carrier (CC) and/or at least one scheduled CC; and receive a configuration indicating a value of a minimum scheduling offset parameter, the value of the configured minimum scheduling offset parameter based at least in part on the indicated preferred value.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform network node methods discussed herein, such as the methods discussed with reference to FIG. 10 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an indication unit 34 configured to perform WD methods discussed herein, such as the methods discussed with reference to FIG. 11 as well as other figures.

Figure 5:
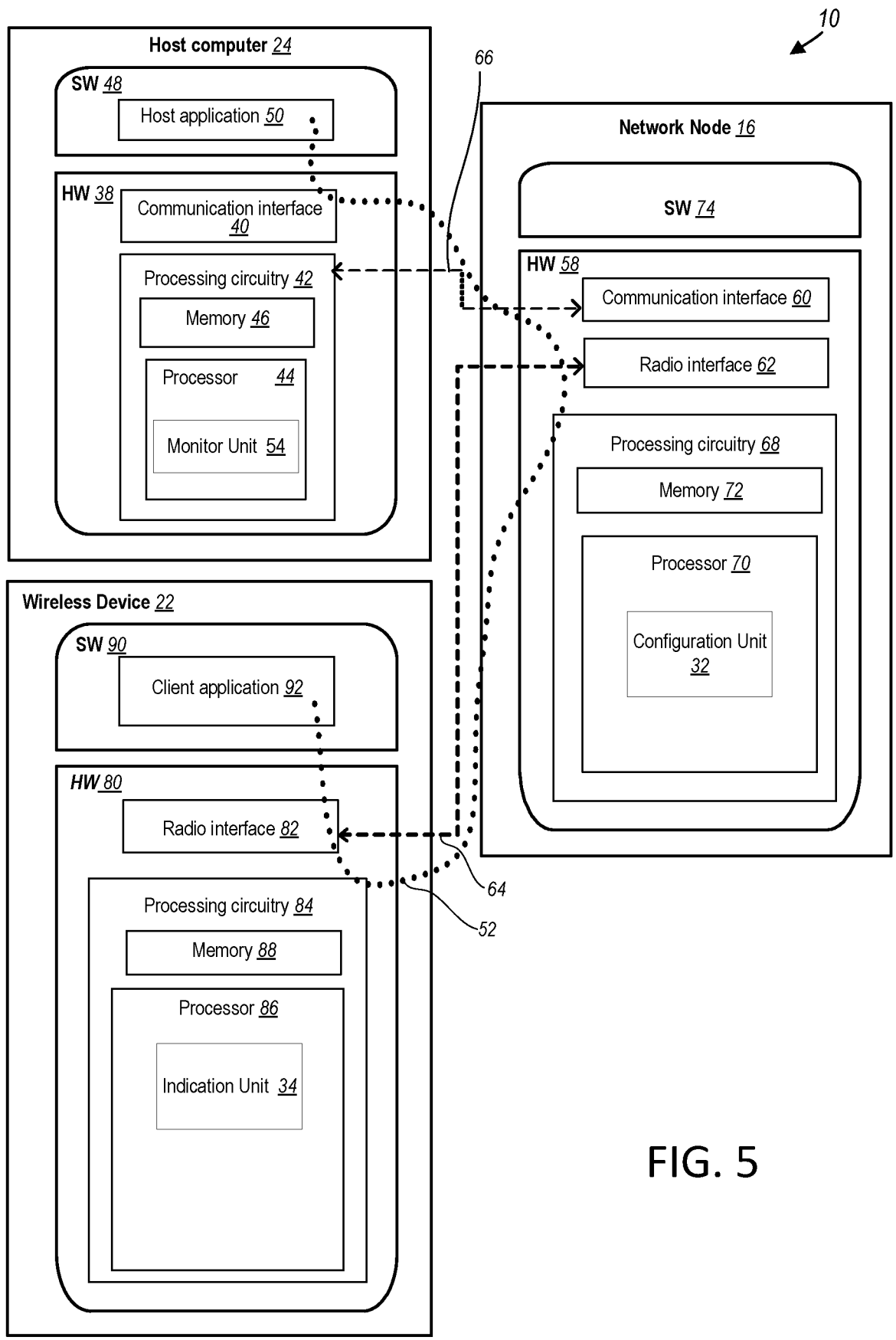
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as configuration unit 32, and indication unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
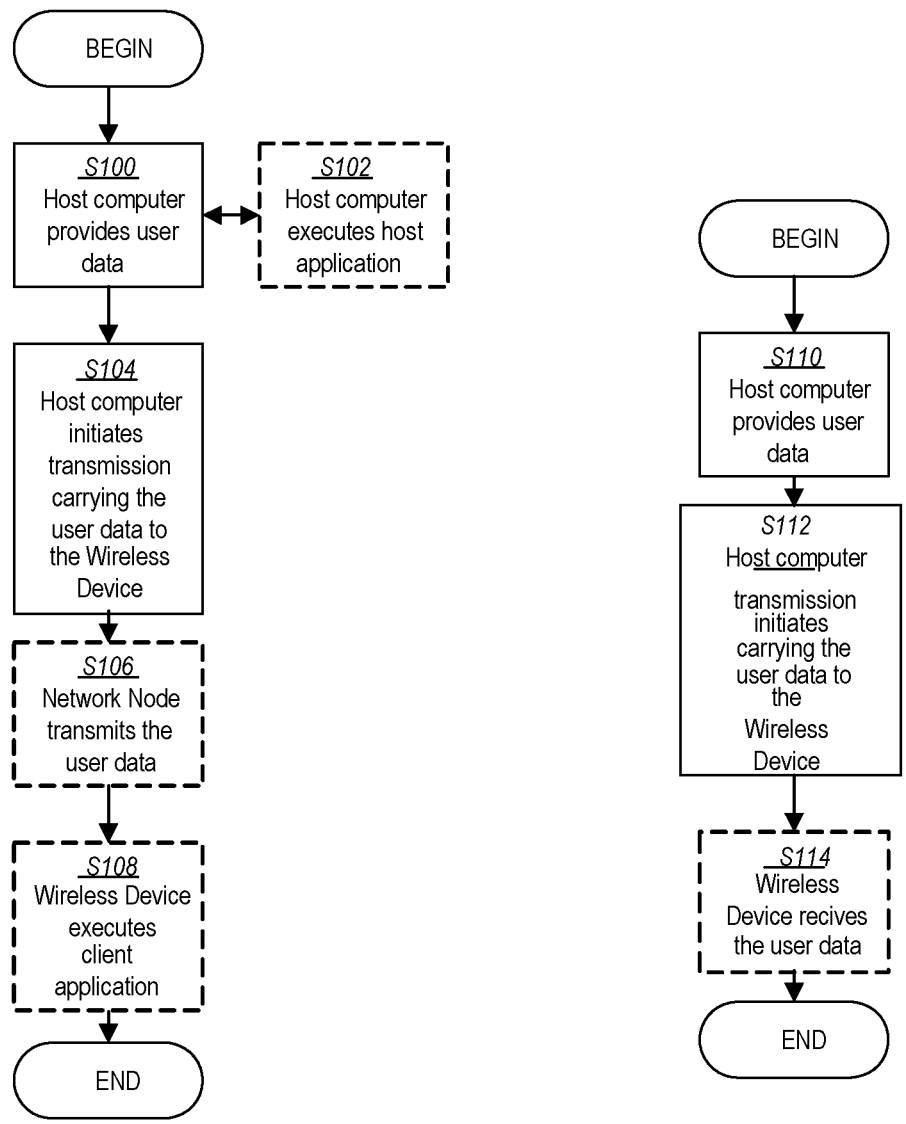
FIG. 6 is a flowchart illustrating exemplary methods implemented in a communication system including a host computer, a network node and a wireless device for executing a client application at a wireless device according to some embodiments of the present disclosure.
FIG. 7 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
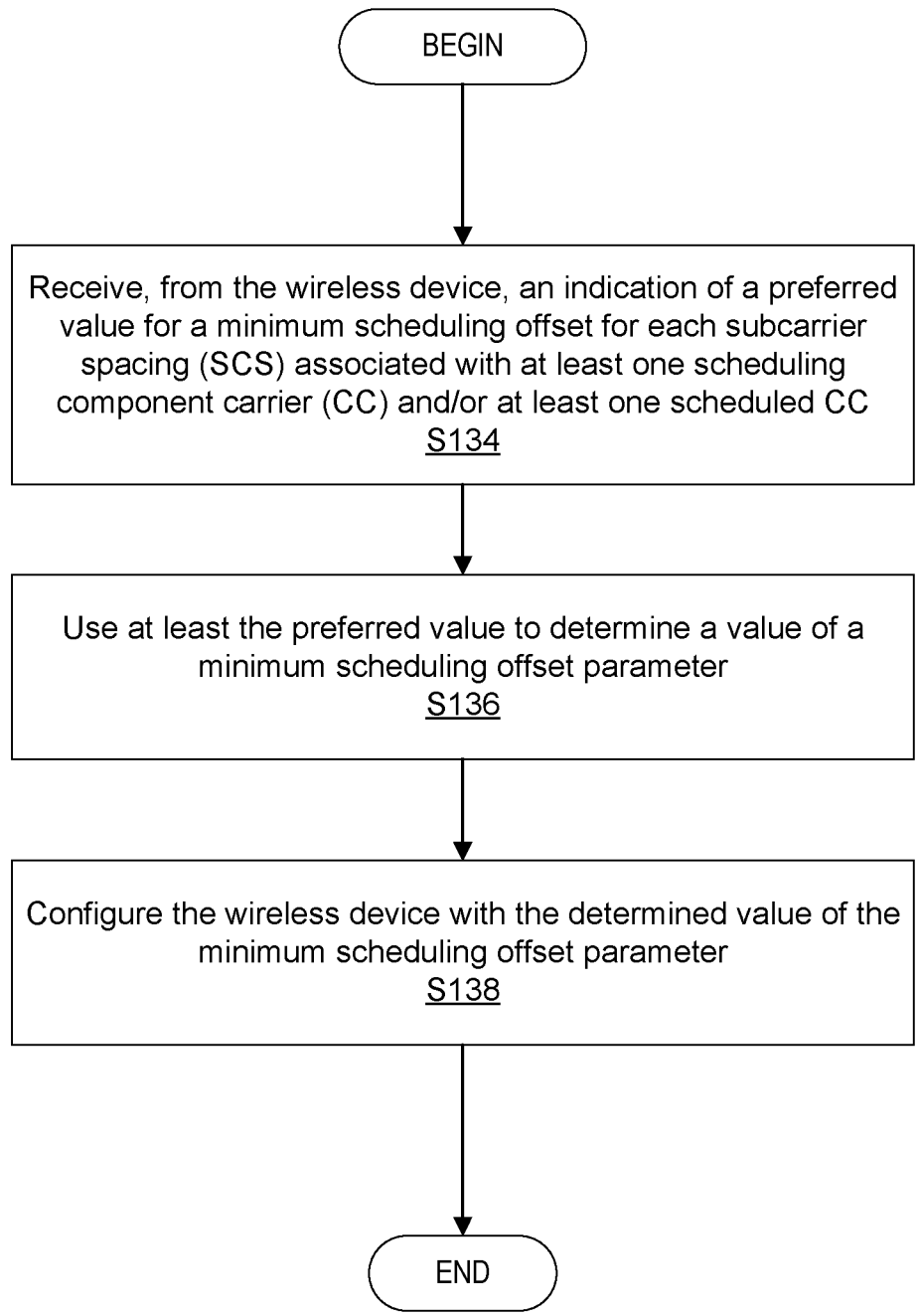
FIG. 10 is a flowchart of an exemplary process in a network node for configuration unit according to some embodiments of the present disclosure.

FIG. 10 is a flowchart of an exemplary process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method. The example method includes receiving (Block S134), such as via configuration unit 32, processing circuitry 68, processor 70, communication interface 60 and/or radio interface 62, from the wireless device 22, an indication of a preferred value for a minimum scheduling offset for each subcarrier spacing (SCS) associated with at least one scheduling component carrier (CC) and/or at least one scheduled CC. The method includes using (Block S136), such as via configuration unit 32, processing circuitry 68, processor 70, communication interface 60 and/or radio interface 62, at least the preferred value to determine a value of a minimum scheduling offset parameter. The method includes configuring (Block S138), such as via configuration unit 32, processing circuitry 68, processor 70, communication interface 60 and/or radio interface 62, the wireless device with the determined value of the minimum scheduling offset parameter.

In some embodiments, using the at least one preferred value further comprises one or more of: using the preferred value as the value of the minimum scheduling offset parameter if the scheduling CC and the scheduled CC have a same SCS and using the preferred value to determine a normalized value for the minimum scheduling offset parameter if the scheduling CC and the scheduled CC have a different SCS; determining, such as via configuration unit 32, processing circuitry 68, processor 70, communication interface 60 and/or radio interface 62, the value of the minimum scheduling offset parameter by increasing or decreasing the preferred value based at least in part on a physical downlink control channel (PDCCH) monitoring case; and determining, such as via configuration unit 32, processing circuitry 68, processor 70, communication interface 60 and/or radio interface 62, the value of the minimum scheduling offset parameter based at least in part on the preferred value, a numerology of the at least one scheduling CC and/or a numerology of the at least one scheduled CC, a factor dependent on a PDCCH monitoring case and a limiting factor indicating an allowed maximum scheduling offset value.

In some embodiments, the method further includes configuring, such as via configuration unit 32, processing circuitry 68, processor 70, communication interface 60 and/or radio interface 62, the wireless device with a limiting factor indicating an allowed maximum scheduling offset value. In some embodiments, the method includes performing, such as via configuration unit 32, processing circuitry 68, processor 70, communication interface 60 and/or radio interface 62, cross-carrier scheduling for the wireless device; and receiving and/or transmitting signaling, such as via configuration unit 32, processing circuitry 68, processor 70, communication interface 60 and/or radio interface 62, based at least in part on the cross-carrier scheduling and the value of the configured minimum scheduling offset parameter.

Figure 11:
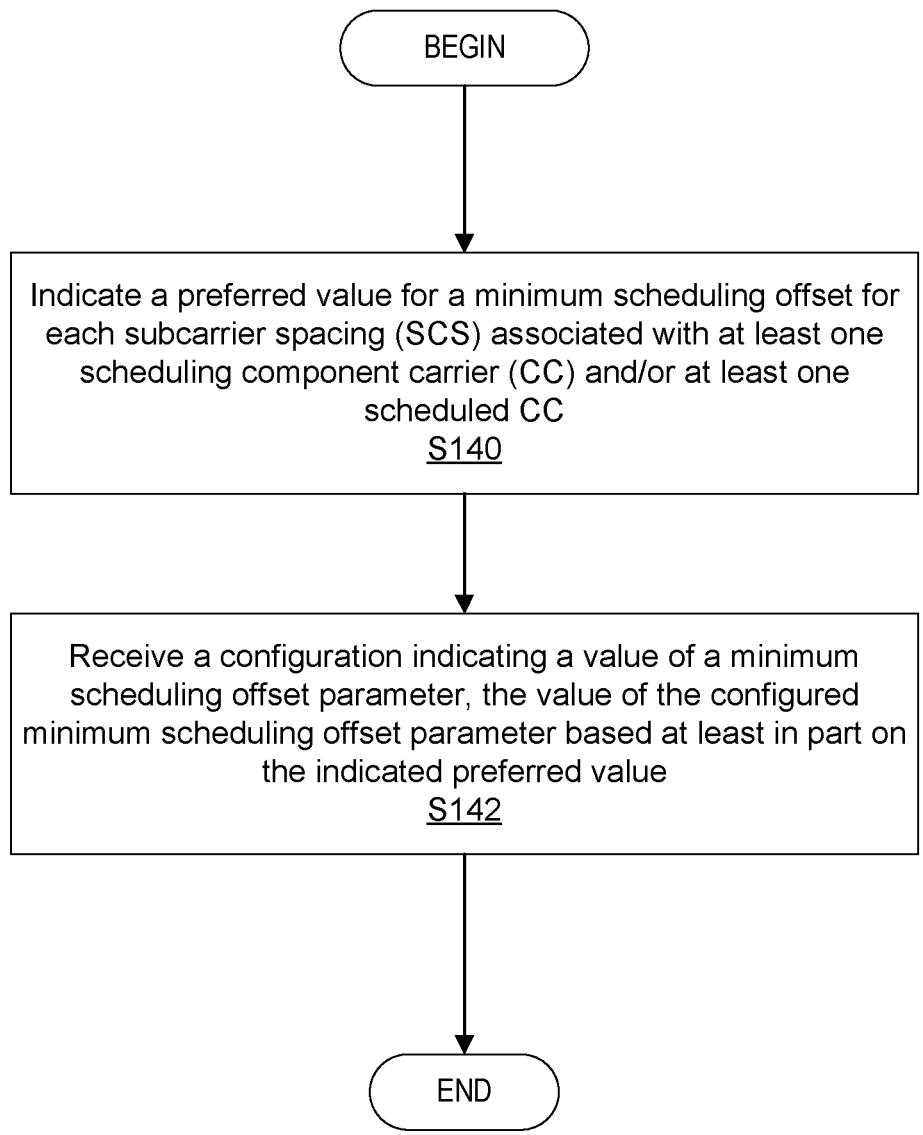
FIG. 11 is a flowchart of an exemplary process in a wireless device for indication unit according to some embodiments of the present disclosure.
Figure 12:
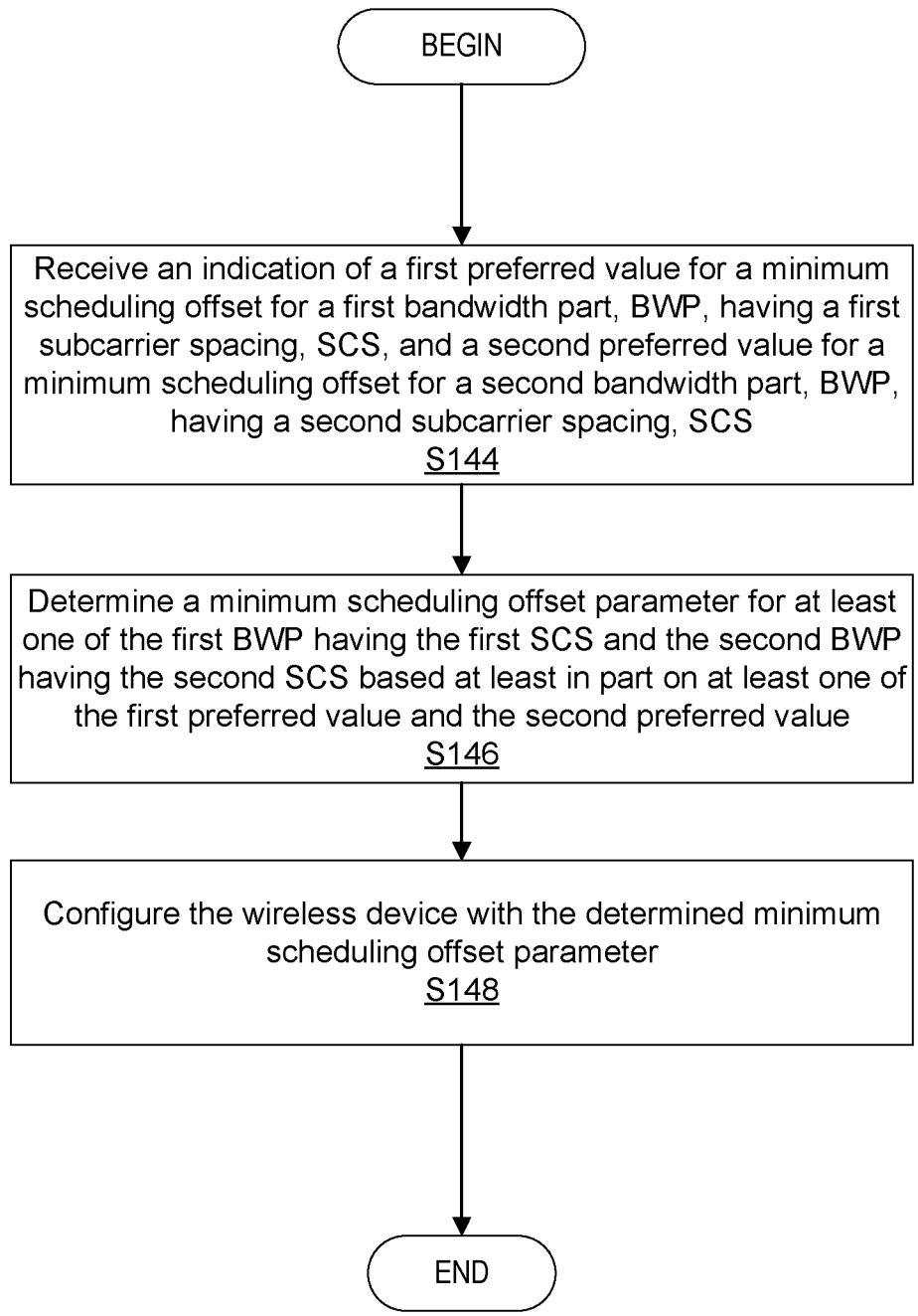
FIG. 12 is a flowchart of an exemplary process in a network node for configuration unit according to some embodiments of the present disclosure.
Figure 13:
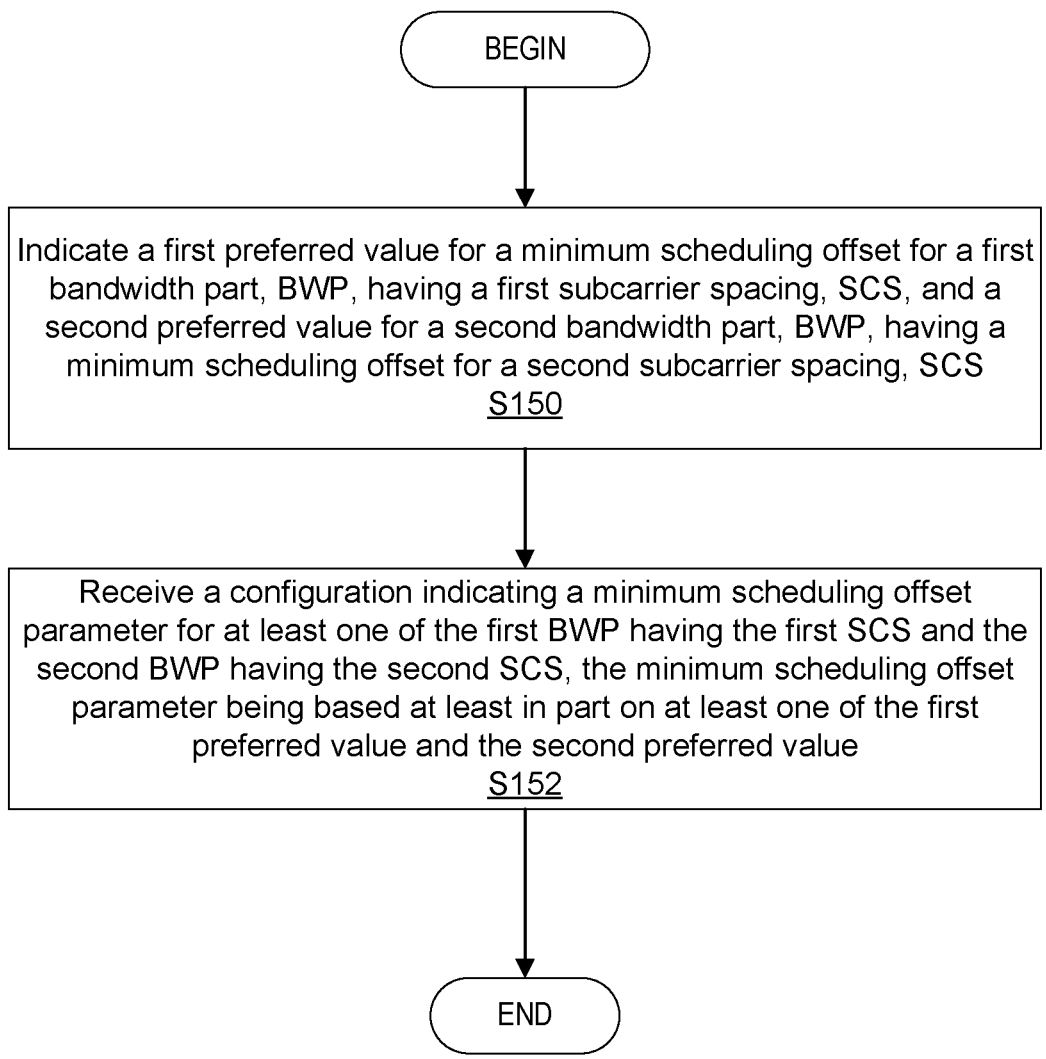
FIG. 13 is a flowchart of an exemplary process in a wireless device for indication unit according to some embodiments of the present disclosure.

FIG. 11 is a flowchart of an exemplary process in a wireless device 22 according to some embodiments of the present disclosure. One or more Blocks and/or functions and/or methods performed by WD 22 may be performed by one or more elements of WD 22 such as by indication unit 34 in processing circuitry 84, processor 86, radio interface 82, etc. The example method includes indicating (Block S140), such as via indication unit 34, processing circuitry 84, processor 86 and/or radio interface 82, a preferred value for a minimum scheduling offset for each subcarrier spacing (SCS) associated with at least one scheduling component carrier (CC) and/or at least one scheduled CC. The method includes receiving (Block S142), such as via indication unit 34, processing circuitry 84, processor 86 and/or radio interface 82, a configuration indicating a value of a minimum scheduling offset parameter, the value of the configured minimum scheduling offset parameter based at least in part on the indicated preferred value.

In some embodiments, the value of the minimum scheduling offset parameter is the preferred value if the scheduling CC and the scheduled CC have a same SCS and the value of the minimum scheduling offset parameter is a normalized value if the scheduling CC and the scheduled CC have a different SCS. In some embodiments, the value of the minimum scheduling offset parameter is based at least in part on the preferred value and a physical downlink control channel (PDCCH) monitoring case.

In some embodiments, the value of the minimum scheduling offset parameter is based at least in part on the preferred value, a numerology of the at least one scheduling CC and/or a numerology of the at least one scheduled CC, a factor dependent on a PDCCH monitoring case and a limiting factor indicating an allowed maximum scheduling offset value. In some embodiments, the method further includes receiving a configuration of a limiting factor indicating an allowed maximum scheduling offset value. In some embodiments, the method further includes receiving a cross-carrier scheduling for the wireless device; and receiving and/or transmitting signaling based at least in part on the cross-carrier scheduling and the value of the configured minimum scheduling offset parameter.

FIG. 10 is a flowchart of an exemplary process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method. The example method includes receiving (Block S144), such as via configuration unit 32, processing circuitry 68, processor 70, communication interface 60 and/or radio interface 62, an indication of a first preferred value for a minimum scheduling offset for a first bandwidth part, BWP, having a first subcarrier spacing, SCS, and a second preferred value for a minimum scheduling offset for a second bandwidth part, BWP, having a second subcarrier spacing, SCS. The method includes determining (Block S146), such as via configuration unit 32, processing circuitry 68, processor 70, communication interface 60 and/or radio interface 62, a minimum scheduling offset parameter for at least one of the first BWP having the first SCS and the second BWP having the second SCS based at least in part on at least one of the first preferred value and the second preferred value. The method includes configuring (Block S148), such as via configuration unit 32, processing circuitry 68, processor 70, communication interface 60 and/or radio interface 62, the wireless device with the determined minimum scheduling offset parameter.

In some embodiments, the first SCS is associated with the first BWP of a scheduling component carrier, CC, and the second SCS is associated with the second BWP of a scheduled CC. In some embodiments, the scheduling CC and the scheduled CC are a same CC. In some embodiments, the scheduling CC and the scheduled CC are different CCs. In some embodiments, the first BWP and the second BWP are a same BWP. In some embodiments, the first BWP and the second BWP are different BWPs. In some embodiments, determining the minimum scheduling offset parameter comprises determining, such as via configuration unit 32, processing circuitry 68, processor 70, communication interface 60 and/or radio interface 62, the minimum scheduling offset parameter for the second BWP of the scheduled CC having the second SCS.

In some embodiments, determining the minimum scheduling offset parameter comprises determining, such as via configuration unit 32, processing circuitry 68, processor 70, communication interface 60 and/or radio interface 62, the minimum scheduling offset parameter based at least in part on whether the first SCS associated with the first BWP of the scheduling CC and the second SCS associated with the second BWP of the scheduled CC are a same. In some embodiments, determining the minimum scheduling offset parameter comprises using, such as via configuration unit 32, processing circuitry 68, processor 70, communication interface 60 and/or radio interface 62, one of the first preferred value and the second preferred value as the minimum scheduling offset parameter when the first SCS associated with the BWP of the scheduling CC and the second SCS associated with the BWP of the scheduled CC are the same.

In some embodiments, determining the minimum scheduling offset parameter comprises determining, such as via configuration unit 32, processing circuitry 68, processor 70, communication interface 60 and/or radio interface 62, the minimum scheduling offset parameter based at least in part on whether the first SCS associated with the first BWP of the scheduling CC and the second SCS associated with the second BWP of the scheduled CC are different. In some embodiments, determining the minimum scheduling offset parameter for the second BWP of the scheduled CC associated with the second SCS from: the first and second preferred values; the first and second SCSs; and a limiting factor, L, denoting a maximum allowed scheduling offset for the second BWP of the scheduled CC having the second SCS.

In some embodiments, determining the minimum scheduling offset parameter comprises determining, such as via configuration unit 32, processing circuitry 68, processor 70, communication interface 60 and/or radio interface 62, the minimum scheduling offset parameter using a ratio between the second SCS and the first SCS. In some embodiments, the minimum scheduling offset parameter is determined using a multiplication of the first preferred value for the first SCS with the ratio between the second SCS and the first SCS. In some embodiments, determining the minimum scheduling offset parameter comprises determining, such as via configuration unit 32, processing circuitry 68, processor 70, communication interface 60 and/or radio interface 62, the minimum scheduling offset parameter based at least in part on a physical downlink control channel, PDCCH, monitoring case.

In some embodiments, determining the minimum scheduling offset parameter comprises setting, such as via configuration unit 32, processing circuitry 68, processor 70, communication interface 60 and/or radio interface 62, a parameter, a, to a first value when a first PDCCH monitoring case is used to cross-slot schedule the wireless device; and setting, such as via configuration unit 32, processing circuitry 68, processor 70, communication interface 60 and/or radio interface 62, the parameter a to a second value when a second PDDCH monitoring case is used to cross-slot schedule the wireless device, the minimum scheduling offset parameter being based further on the parameter a.

In some embodiments, determining the minimum scheduling offset parameter comprises determining the minimum scheduling offset parameter based at least in part on a last physical downlink control channel, PDCCH, symbol within a slot. In some embodiments, determining the minimum scheduling offset parameter comprises calculating, such as via configuration unit 32, processing circuitry 68, processor 70, communication interface 60 and/or radio interface 62, the minimum scheduling offset parameter, k, for the second BWP of the scheduled CC having the second SCS, $\mu_M$, according to:

$$K^{\mu_M} = \min\left(\max_{x \in X}\left(\left\lceil (K_{\mu_x} + \alpha)\frac{\mu_M}{\mu_x}\right\rceil\right), L\right),$$

where $K_{\mu_x}$ represents at least one of the first preferred value and the second preferred value; $\mu_x$ represents the first SCS of the scheduling CC; $\alpha$ represents a parameter based on a physical downlink control channel, PDCCH, monitoring case; X represents all numerologies included in the scheduling CC; and L represents a maximum allowed scheduling offset for the second BWP of the scheduled CC having the second SCS.

In some embodiments, determining the minimum scheduling offset parameter comprises determining the minimum scheduling offset parameter based at least in part on a maximum allowed scheduling offset value. In some embodiments, configuring the wireless device further comprises configuring, such as via configuration unit 32, processing circuitry 68, processor 70, communication interface 60 and/or radio interface 62, the wireless device with the determined minimum scheduling offset parameter via radio resource control, RRC, signaling. In some embodiments, the method further includes performing, such as via configuration unit 32, processing circuitry 68, processor 70, communication interface 60 and/or radio interface 62, cross-carrier scheduling for the wireless device; and receiving and/or transmitting, such as via configuration unit 32, processing circuitry 68, processor 70, communication interface 60 and/or radio interface 62, signaling based at least in part on the cross-carrier scheduling and the determined minimum scheduling offset parameter.

FIG. 11 is a flowchart of an exemplary process in a wireless device 22 according to some embodiments of the present disclosure. One or more Blocks and/or functions and/or methods performed by WD 22 may be performed by one or more elements of WD 22 such as by indication unit 34 in processing circuitry 84, processor 86, radio interface 82, etc. The example method includes indicating (Block S150), such as via indication unit 34, processing circuitry 84, processor 86 and/or radio interface 82, a first preferred value for a minimum scheduling offset for a first bandwidth part, BWP, having a first subcarrier spacing, SCS, and a second preferred value for a second bandwidth part, BWP, having a minimum scheduling offset for a second subcarrier spacing, SCS. The method includes receiving (Block S152), such as via indication unit 34, processing circuitry 84, processor 86 and/or radio interface 82, a configuration indicating a minimum scheduling offset parameter for at least one of the first BWP having the first SCS and the second BWP having the second SCS, the minimum scheduling offset parameter being based at least in part on at least one of the first preferred value and the second preferred value.

In some embodiments, the first SCS is associated with the first BWP of a scheduling component carrier, CC, and the second SCS is associated with the second BWP of a scheduled CC. In some embodiments, the scheduling CC and the scheduled CC are a same CC. In some embodiments, the scheduling CC and the scheduled CC are different CCs. In some embodiments, the first BWP and the second BWP are a same BWP. In some embodiments, the first BWP and the second BWP are different BWPs. In some embodiments, determining the minimum scheduling offset parameter comprises determining the minimum scheduling offset parameter for the second BWP of the scheduled CC having the second SCS.

In some embodiments, the minimum scheduling offset parameter is further based at least in part on whether the first SCS associated with the first BWP of the scheduling CC and the second SCS associated with the second BWP of the scheduled CC are a same. In some embodiments, the minimum scheduling offset parameter is equal to one of the first preferred value and the second preferred value when the first SCS associated with the first BWP of the scheduling CC and the second SCS associated with the second BWP of the scheduled CC are the same. In some embodiments, the minimum scheduling offset parameter is further based at least in part on whether the first SCS associated with the first BWP of the scheduling CC and the second SCS associated with the second BWP of the scheduled CC are different.

In some embodiments, determining the minimum scheduling offset parameter for the second BWP of the scheduled CC associated with the second SCS from: the first and second preferred values; the first and second SCSs; and a limiting factor, L, denoting a maximum allowed scheduling offset for the second BWP of the scheduled CC having the second SCS. In some embodiments, the minimum scheduling offset parameter is further based at least in part on a ratio between the second SCS and the first SCS. In some embodiments, the minimum scheduling offset parameter is further based at least in part on a multiplication of the first preferred value for the first SCS with the ratio between the second SCS and the first SCS.

In some embodiments, the minimum scheduling offset parameter is further based at least in part on a physical downlink control channel, PDCCH, monitoring case. In some embodiments, the minimum scheduling offset parameter is further based at least in part on a last physical downlink control channel, PDCCH, symbol within a slot. In some embodiments, the minimum scheduling offset parameter is further based at least in part on a calculation of the minimum scheduling offset parameter, k, for the second BWP of the scheduled CC having the second SCS, $\mu_M$, according to:

$$K^{\mu_M} = \min\left(\max_{x \in X}\left(\left[(K_{\mu_x} + \alpha)\frac{\mu_M}{\mu_x}\right]\right), L\right),$$

where $K_{\mu_x}$ represents at least one of the first preferred value and the second preferred value; $\mu_x$ represents the first SCS of the scheduling CC; $\alpha$ represents a parameter based on a physical downlink control channel, PDCCH, monitoring case; X represents all numerologies included in the scheduling CC; and L representing a maximum allowed scheduling offset for the second BWP of the scheduled CC having the second SCS.

In some embodiments, the minimum scheduling offset parameter is further based at least in part on a maximum allowed scheduling offset value. In some embodiments, receiving the configuration further comprises receiving, such as via indication unit 34, processing circuitry 84, processor 86 and/or radio interface 82, the minimum scheduling offset parameter via radio resource control, RRC, signaling. In some embodiments, the method further includes receiving, such as via indication unit 34, processing circuitry 84, processor 86 and/or radio interface 82, a cross-carrier scheduling; and receiving and/or transmitting, such as via indication unit 34, processing circuitry 84, processor 86 and/or radio interface 82, signaling based at least in part on the cross-carrier scheduling and the minimum scheduling offset parameter.

Having described the general process flow of arrangements of the disclosure and having provided examples of hardware and software arrangements for implementing the processes and functions of the disclosure, the sections below provide details and examples of arrangements for minimum scheduling offset interpretation, which may be implemented by the network node 16, wireless device 22 and/or host computer 24.

In some embodiments, a scenario is considered when the WD 22 sends a preferred minimumSchedulingOffset for each SCS, e.g. 15, 30, 60, and 120 kHz SCS.

Having those preferred values, the network node 16 then may configure the suitable minimum scheduling offset parameter (minimumSchedulingOffset) for each BWP of the scheduled CCs. Note that this could include the same-carrier scheduling case, i.e., when the scheduling CC is the same as the scheduled CC; and cross-carrier scheduling, i.e., when the scheduling CC is different from the scheduled CC.

In configuring the minimumSchedulingOffset, the network node 16 can consider one or more aspects, such as for example one or more of the following:
 1. The minimumSchedulingOffset values suggested by the WD 22.

In one example, the minimumSchedulingOffset values suggested by the WD 22 represents a minimumSchedulingOffset that could bring the optimum power-saving gain based on the WD 22 hardware and software configuration and/or tradeoff with latency and WD 22 throughput. In another example, the minimum scheduling offset is driven based on the WD 22 processing time for PDCCH decoding. For example, if the PDCCH decoding takes less than time than a slot for a specific SCS, the WD 22 may note the minimumSchedulingOffset as one or two depending on where the WD 22 expects the PDCCH to occur within the slot, or if the PDCCH processing time is more than one slot, a higher number can be reported as the minimumSchedulingOffset.

2. The SCS of the scheduling CC's BWP and the SCS of the scheduled CC's BWP.

In one example, if the SCS of both BWPs are the same, the network node 16 can simply consider the minimumSchedulingOffset of the SCS as the WD 22 preferred one.

In another example, if cross-carrier scheduling with mixed numerology is used and thus the SCS of the scheduling CC and the scheduled CC are different, the network node 16 can use a normalized value of the minimumSchedulingOffset of the scheduling CC SCS relative to the scheduled CC SCS. The normalized value, for example, can be obtained by multiplying the suggested minimumSchedulingOffset of the scheduling CC with the ratio between the scheduled CC SCS and the scheduling CC SCS, rounded or rounded up to the closest integer number of slots.

In yet another related example, the network node 16 may use the maximum of the normalized value of the minimumSchedulingOffset of the scheduling CC SCS and the minimumSchedulingOffset of the scheduled CC SCS. If the SCS of both are the same, the network node 16 may use the maximum of the minimumSchedulingOffset value of the scheduling CC and the scheduled CC. In some embodiment, the network node 16 may use the minimum of the two values instead.

3. PDCCH monitoring case: In some configurations, it is possible that the network node 16 configures the WD 22 with PDCCH monitoring case 1-2 or case 2 or any other PDCCH monitoring where the PDCCH monitoring occasion (MO) can be expected to be anywhere in the slot. In some embodiments, as the WD 22 does not know the PDCCH monitoring case that will be used during the transmission when sending the suggested minimumSchedulingOffset to the network node 16, it can be assumed that the WD 22 sends the suggested value based on PDCCH monitoring case 1-1 as the typical PDCCH monitoring case. Thus, the network node 16 may also consider what kind of PDCCH monitoring case that will be used in the transmission in configuring the minimumSchedulingOffset value.

For example, if PDCCH monitoring case 1-2 is employed and further, the associated PDCCH MO comes after a specific symbol within the slot, the network node 16 may determine to increase the minimumSchedulingOffset by a specific amount, e.g., 1 additional slot. Similarly, if PDCCH monitoring case 2 is employed, and further, the last PDCCH MO in a slot comes after a specific symbol within the slot, the network node 16 may determine to increase the minimumSchedulingOffset by a specific amount, e.g., 1 additional slot.

4. Maximum value of minimumSchedulingOffset: In some embodiments, specifications/standardization may determine an upper bound of the minimumSchedulingOffset that can be set in the RRC for each SCS. If such upper bound is specified, the network node 16 may not configure the minimumSchedulingOffset to be larger than this maximum value.

Considering one or more of the above factors, one or more of the following methods can be used by the network node 16 to configure the minimumSchedulingOffset for a scheduled CC BWP.

In a first example, the method described below may be used by the network node 16 when same-carrier scheduling is used and a PDCCH monitoring case which is different with the reference PDCCH monitoring case is applied. The method may include one or more of the following steps by the network node 16:

1. Receiving a suggested value $K_{\mu_x}$ for minimumSchedulingOffset from a WD 22, wherein the suggested value is associated with a first numerology and for a reference PDCCH monitoring case (e.g., PDCCH monitoring case 1-1).
2. Deriving a minimumSchedulingOffset value for a second PDCCH monitoring case (e.g. case 1-2), where the second PDCCH monitoring case may be different from the reference PDCCH monitoring case. In the case of more than one PDCCH formats and/or the end of the PDCCH symbol locations are configured in a BWP, the network node 16 may select the latest possible end of the PDCCH symbol location within a slot for those configurations.
3. The derived value may be based on at least one or more of the following factors:
First suggested value;
First numerology;
A value for a first factor (e.g., a) that is dependent on the second PDCCH monitoring case. The value of a can further be based on the last symbol of a reference PDCCH monitoring case and the end symbol of the second PDCCH monitoring case. In another embodiment, the value of a can also be based on standardized processing time required by the scheduling CC to schedule CC with a higher SCS. In this embodiment, the value of a depends, at least, on the scheduling SCS and the PDCCH monitoring case.
A limiting factor L, which denotes the maximum allowed minimumSchedulingOffset that can be configured in RRC for the respective scheduled CC SCS.
4. Transmitting a control message on the CC according to the second PDCCH monitoring case to schedule data according to the derived minimumSchedulingOffset value.

In a second example, the method described below may be used by the network node 16 when cross-carrier scheduling is used and a PDCCH monitoring case which is the same with the reference PDCCH monitoring case is applied. The method may include one or more of the following steps by the network node 16:

1. Receiving suggested value $K_{\mu_x}$ for minimumSchedulingOffset from a WD 22, wherein the first suggested value is associated with the first numerology and for a reference PDCCH monitoring case (e.g., PDCCH monitoring case 1-1) and the second suggested value is associated with the second numerology for a reference PDCCH monitoring case.
2. The network node 16 (e.g., gNB) configures the WD 22 with a scheduling CC and a scheduled CC pair, wherein at least one scheduling CC has the first numerology and the scheduled CC has the second numerology.
3. Deriving a minimumSchedulingOffset value for the scheduled CC and associated with the pair given by (scheduling CC, scheduled CC).
4. The derived value may at least based on one or more of the following factors:
First suggested value;
First numerology;
Second suggested value;
Second numerology; and
A limiting factor L, which denotes the maximum allowed minimumSchedulingOffset that can be configured in RRC for the respective scheduled CC SCS.

5. Transmitting a control message on the CC according to second PDCCH monitoring case to schedule data according to the derived minimumSchedulingOffset value.

In yet another embodiment, combinations of the above methods can be used by the network node 16 to derive the minimumSchedulingOffset value when cross-carrier scheduling is used and a PDCCH monitoring case which is different with the reference PDCCH monitoring case is applied. For example, by inserting the second and third items of the first method example (i.e., derives a minimumSchedulingOffset value for a second PDCCH monitoring case) as a factor in item 4 of the second method example above.

As an example, using the above methods, the following formula can be used by the network node 16 to determine the configured minimumSchedulingOffset, K, of a BWP in the scheduled CC with a numerology of $\mu_M$. In the below formula, $\mu_x$ denotes a numerology of the scheduling CC and X denotes all numerologies included in the scheduling CC. Note that the following formula and steps may be used only as an example. A derivation, modification, etc. based on the above methods should is not precluded:

$$K^{\mu_M} = \min\left(\max_{x \in X}\left(\left\lceil (K_{\mu_x} + \alpha)\frac{\mu_M}{\mu_x}\right\rceil\right), L\right),$$

Specifically, in some embodiments, the above formula can be explained as, the network node 16 performing one or more of the following:
1. Receiving and storing the suggested minimumSchedulingOffset from the WD 22 for each numerology, $K_{\mu_x}$.
2. Determining the value of parameter a. For example, the value of a can be either 0 or 1. The determination of the whether to use 0 or 1 may be based on the PDCCH monitoring case that is used in the scheduling CC. For example:
  If PDCCH monitoring case 1-1 is used the value of a can be set to 0.
  If PDCCH monitoring case 2 is used, the value of a can be set to 1.
  If PDCCH monitoring case 1-2 is used, the network node 16 can further check in which symbols in a slot the PDCCH monitoring will end. The WD 22 then may determine the value of a based on this information and the numerology of the scheduling CC. For example:
    For a scheduling CC with numerology 0 and 1 (SCS=15 kHz and 30 kHz) the value of α can be set to 0 if the PDCCH monitoring ends at $10^{th}$ symbol or smaller. Otherwise, set the value of α to 1.
    For a scheduling CC with numerology 2 (SCS=60 kHz) the value of α can be set to 0 if the PDCCH monitoring ends at $7^{th}$ symbol or smaller. Otherwise, set the value of α to 1.
    For a scheduling CC with numerology 3 (SCS=120 kHz) the value of α can be set to 0 if the PDCCH monitoring ends at $11^{th}$ symbol or smaller. Otherwise, set the value of α to 1.
3. Normalizing and/or quantizing the value obtained from steps 1 and 2 for all numerology that is used in the scheduling CC to the numerology used in the BWP of the scheduled cell.
4. Determining the maximum value of all values obtained in step 3.
5. Determining whether the value obtained in Step 4 is larger than the maximum possible value of minimumSchedulingOffset that can be configured in the RRC for the respected scheduled CC SCS, L. If the value obtained in Step 4 is smaller than L, then that value will be used as the configured minimumSchedulingOffset value. Otherwise, use L as the configured minimumSchedulingOffset value.

In some embodiments, the value of parameter a may also assume a fractional value between 0 and 1, to account for PDCCH offsets with respect to the beginning of the slot in the scheduling CC that are larger than zero but smaller than the entire slot. Fractional a may allow specifying a shorter minimum offset (compared to α=1) that is still sufficient for the WD 22.

In addition to the examples above, the network node 16 may consider other aspects in determining the minimumschedulingoffset. For example, the network node 16 may reduce or increase this value in order to have sufficient scheduling flexibilities for different WDs 22. Furthermore, other WD 22 capabilities or assistance information can be taken into account. For example, if the network node 16 is aware of the WD 22 processing time for PDCCH in each SCS, the network node 16 may override the preferred minimumschedulingoffset from the WD 22.

In one embodiment, it may also be possible to implement the above methods implicitly. For example, the minimumSchedulingOffset configured by the network node 16 may remain under the PDCCH monitoring case 1-1 assumption. In implementing the actual minimumSchedulingOffset, the WD 22 and the network node 16 may agree that when the WD 22 is configured with PDCCH monitoring other than PDCCH monitoring case 1-1, an additional slot(s) might be added to the configured minimumSchedulingOffset.

In one embodiment, the network node 16 may consider WD 22 processing timeline and WD 22 hardware (HW) constraint information for properly interpreting the minimumschedulingoffset values, especially translating the values when switching between different numerologies. In a WD 22 receiver, the preferred minimum offset for efficient power savings (PS), may depend on multiple factors, such as, for example: PDCCH samples collection, PDCCH demodulation and decoding time budget, HW activation time of secondary cell (Scell) in the case of cross-carrier scheduling, HW transition times for switching receiver configurations, etc. Some of these components scale with SCS, others do not, which the network node 16 may consider when translating the minimum offset values between numerologies. In some related embodiments, the WD 22 may provide such information to the network node 16 via WD 22 assistance signaling. In other embodiments, the network node 16 may assume predetermined values for typical WD 22 implementations.

From the WD 22 behavior aspect, in one example, the WD 22 may determine that the network node 16 consistently or substantially follows the WD 22 minimumschedulingoffset recommendation. As such the WD 22 may adapt its recommendation (e.g., offset value) according to different criteria. For example, the WD 22 may increase the recommendation (e.g., offset value) in order to save additional power, or alternatively reduce the recommendation (e.g., offset value) to improve the latency. Furthermore, upon configuration of the minimumschedulingoffset by the network node 16, the WD 22 may adapt its power savings measures accordingly. For example, if the WD 22 is configured with cross-carrier scheduling, and the configured minimumschedulingoffset is more than a predetermined amount, the WD 22 may adapt a power saving mode with lower power consumption than the default case where the WD 22 e.g., only turns of the radio frequency (RF) part and thus does not buffer PDSCH. In such case, the WD 22 may turn off additional modules to achieve a higher power saving. The predetermined amount may be specific for the given cross-carrier configuration, as different Primary cell/secondary cell (PCell/Scell) configurations may exhibit different CC hardware (HW) activation latencies. In particular, such latencies in the cross-carrier scheduling case may be higher than in the case or receiver (RX) reconfiguration in the same-carrier scheduling case.

Some embodiments may include:
a method for configuring the minimumSchedulingOffset of a BWP in a scheduled CC, which includes one or more of:
minimumSchedulingOffset value suggested by the WD 22;
the numerology of the scheduling CC's BWP and the scheduled CC's BWP;
additional factor(s) related to the PDCCH monitoring case; and/or
upper bound of the minimumSchedulingOffset value.

Some embodiments may include one or more of the following:

Embodiment A1. A network node configured to communicate with a wireless device (WD), the network node configured to, and/or comprising a radio interface and/or comprising processing circuitry configured to:
receive, from the wireless device, an indication of a preferred value for a minimum scheduling offset for each subcarrier spacing (SCS) associated with at least one scheduling component carrier (CC) and/or at least one scheduled CC;
use at least the preferred value to determine a value of a minimum scheduling offset parameter; and
configure the wireless device with the determined value of the minimum scheduling offset parameter.

Embodiment A2. The network node of Embodiment A1, wherein the network node and/or the radio interface and/or the processing circuitry is further configured to use the at least one preferred value by being configured to one or more of:
use the preferred value as the value of the minimum scheduling offset parameter if the scheduling CC and the scheduled CC have a same SCS and use the preferred value to determine a normalized value for the minimum scheduling offset parameter if the scheduling CC and the scheduled CC have a different SCS;
determine the value of the minimum scheduling offset parameter by increasing or decreasing the preferred value based at least in part on a physical downlink control channel (PDCCH) monitoring case; and
determine the value of the minimum scheduling offset parameter based at least in part on the preferred value, a numerology of the at least one scheduling CC and/or a numerology of the at least one scheduled CC, a factor dependent on a PDCCH monitoring case and a limiting factor indicating an allowed maximum scheduling offset value.

Embodiment A3. The network node of Embodiment A1, wherein the network node and/or the radio interface and/or the processing circuitry is further configured to:
configure the wireless device with a limiting factor indicating an allowed maximum scheduling offset value.

Embodiment A4. The network node of Embodiment A1, wherein the network node and/or the radio interface and/or the processing circuitry is further configured to:
perform cross-carrier scheduling for the wireless device; and
receive and/or transmit signaling based at least in part on the cross-carrier scheduling and the value of the configured minimum scheduling offset parameter.

Embodiment B1. A method implemented in a network node, the method comprising:
receiving, from the wireless device, an indication of a preferred value for a minimum scheduling offset for each subcarrier spacing (SCS) associated with at least one scheduling component carrier (CC) and/or at least one scheduled CC;
using at least the preferred value to determine a value of a minimum scheduling offset parameter; and
configuring the wireless device with the determined value of the minimum scheduling offset parameter.

Embodiment B2. The method of Embodiment B1, wherein using the at least one preferred value further comprises one or more of:
using the preferred value as the value of the minimum scheduling offset parameter if the scheduling CC and the scheduled CC have a same SCS and using the preferred value to determine a normalized value for the minimum scheduling offset parameter if the scheduling CC and the scheduled CC have a different SCS;
determining the value of the minimum scheduling offset parameter by increasing or decreasing the preferred value based at least in part on a physical downlink control channel (PDCCH) monitoring case; and
determining the value of the minimum scheduling offset parameter based at least in part on the preferred value, a numerology of the at least one scheduling CC and/or a numerology of the at least one scheduled CC, a factor dependent on a PDCCH monitoring case and a limiting factor indicating an allowed maximum scheduling offset value.

Embodiment B3. The method of Embodiment B1, further comprising:
configuring the wireless device with a limiting factor indicating an allowed maximum scheduling offset value.

Embodiment B4. The method of Embodiment B1, further comprising:
performing cross-carrier scheduling for the wireless device; and
receiving and/or transmitting signaling based at least in part on the cross-carrier scheduling and the value of the configured minimum scheduling offset parameter.

Embodiment C1. A wireless device (WD) configured to communicate with a network node, the WD configured to, and/or comprising a radio interface and/or processing circuitry configured to:
indicate a preferred value for a minimum scheduling offset for each subcarrier spacing (SCS) associated with at least one scheduling component carrier (CC) and/or at least one scheduled CC; and
receive a configuration indicating a value of a minimum scheduling offset parameter, the value of the configured minimum scheduling offset parameter based at least in part on the indicated preferred value.

Embodiment C2. The wireless device of Embodiment C1, wherein one or more of:
the value of the minimum scheduling offset parameter is the preferred value if the scheduling CC and the scheduled CC have a same SCS and the value of the minimum scheduling offset parameter is a normalized value if the scheduling CC and the scheduled CC have a different SCS;

the value of the minimum scheduling offset parameter is based at least in part on the preferred value and a physical downlink control channel (PDCCH) monitoring case; and the value of the minimum scheduling offset parameter is based at least in part on the preferred value, a numerology of the at least one scheduling CC and/or a numerology of the at least one scheduled CC, a factor dependent on a PDCCH monitoring case and a limiting factor indicating an allowed maximum scheduling offset value.

Embodiment C3. The wireless device of Embodiment C1, wherein the wireless device and/or the radio interface and/or the processing circuitry is further configured to:

receive a configuration of a limiting factor indicating an allowed maximum scheduling offset value.

Embodiment C4. The wireless device of Embodiment C1, wherein the wireless device and/or the radio interface and/or the processing circuitry is further configured to:

receive a cross-carrier scheduling for the wireless device; and receive and/or transmit signaling based at least in part on the cross-carrier scheduling and the value of the configured minimum scheduling offset parameter.

Embodiment D1. A method implemented in a wireless device (WD), the method comprising:

indicating a preferred value for a minimum scheduling offset for each subcarrier spacing (SCS) associated with at least one scheduling component carrier (CC) and/or at least one scheduled CC; and receiving a configuration indicating a value of a minimum scheduling offset parameter, the value of the configured minimum scheduling offset parameter based at least in part on the indicated preferred value.

Embodiment D2. The method of Embodiment D1, wherein one or more of:

the value of the minimum scheduling offset parameter is the preferred value if the scheduling CC and the scheduled CC have a same SCS and the value of the minimum scheduling offset parameter is a normalized value if the scheduling CC and the scheduled CC have a different SCS;

the value of the minimum scheduling offset parameter is based at least in part on the preferred value and a physical downlink control channel (PDCCH) monitoring case; and the value of the minimum scheduling offset parameter is based at least in part on the preferred value, a numerology of the at least one scheduling CC and/or a numerology of the at least one scheduled CC, a factor dependent on a PDCCH monitoring case and a limiting factor indicating an allowed maximum scheduling offset value.

Embodiment D3. The method of Embodiment D1, further comprising:

receiving a configuration of a limiting factor indicating an allowed maximum scheduling offset value.

Embodiment D4. The method of Embodiment D1, further comprising:

receiving a cross-carrier scheduling for the wireless device; and receiving and/or transmitting signaling based at least in part on the cross-carrier scheduling and the value of the configured minimum scheduling offset parameter.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node configured to communicate with a wireless device using cross-slot scheduling, the method comprising:
    receiving an indication of a first preferred value for a minimum scheduling offset for a first bandwidth part, BWP, having a first subcarrier spacing, SCS, and a second preferred value for a minimum scheduling offset for a second bandwidth part, BWP, having a second subcarrier spacing, SCS;
    determining a minimum scheduling offset parameter for at least one of the first BWP having the first SCS and the second BWP having the second SCS based at least in part on at least one of the first preferred value and the second preferred value, the minimum scheduling offset parameter being based at least in part on a processing time for scheduling a component carrier with a higher SCS than a scheduling component carrier; and
    configuring the wireless device with the determined minimum scheduling offset parameter.

2. A method implemented in a wireless device configured to communicate with a network node according to cross-slot scheduling, the method comprising:
    indicating a first preferred value for a minimum scheduling offset for a first bandwidth part, BWP, having a first subcarrier spacing, SCS, and a second preferred value for a second bandwidth part, BWP, having a minimum scheduling offset for a second subcarrier spacing, SCS; and
    receiving a configuration indicating a minimum scheduling offset parameter for at least one of the first BWP having the first SCS and the second BWP having the second SCS, the minimum scheduling offset parameter being based at least in part on at least one of the first preferred value and the second preferred value, the minimum scheduling offset parameter being based at least in part on a processing time for scheduling a component carrier with a higher SCS than a scheduling component carrier.

3. The method of claim 2, wherein the first SCS is associated with the first BWP of a scheduling component carrier, CC, and the second SCS is associated with the second BWP of a scheduled CC.

4. The method of claim 3, wherein the scheduling CC and the scheduled CC are a same CC.

5. The method of claim 3, wherein the scheduling CC and the scheduled CC are different CCs.

6. The method of claim 2, wherein the first BWP and the second BWP are a same BWP.

7. The method of claim 2, wherein the first BWP and the second BWP are different BWPs.

8. The method of claim 3, wherein the configuration indicates the minimum scheduling offset parameter for the second BWP of the scheduled CC having the second SCS.

9. The method of claim 3, wherein the minimum scheduling offset parameter is further based at least in part on whether the first SCS associated with the first BWP of the scheduling CC and the second SCS associated with the second BWP of the scheduled CC are a same.

10. The method of claim 9, wherein the minimum scheduling offset parameter is equal to one of the first preferred value and the second preferred value when the first SCS associated with the first BWP of the scheduling CC and the second SCS associated with the second BWP of the scheduled CC are the same.

11. The method of claim 3, wherein the minimum scheduling offset parameter is further based at least in part on whether the first SCS associated with the first BWP of the scheduling CC and the second SCS associated with the second BWP of the scheduled CC are different.

12. The method of claim 8, wherein the configuration indicates the minimum scheduling offset parameter for the second BWP of the scheduled CC associated with the second SCS determined from: the first and second preferred values; the first and second SCSs; and a limiting factor, L, denoting a maximum allowed scheduling offset for the second BWP of the scheduled CC having the second SCS.

13. The method of claim 2, wherein the minimum scheduling offset parameter is further based at least in part on a ratio between the second SCS and the first SCS.

14. The method of claim 13, wherein the minimum scheduling offset parameter is further based at least in part on a multiplication of the first preferred value for the first SCS with the ratio between the second SCS and the first SCS.

15. The method of claim 2, wherein the minimum scheduling offset parameter is further based at least in part on a physical downlink control channel, PDCCH, monitoring case.

16. The method of claim 2, wherein the minimum scheduling offset parameter is further based at least in part on a last physical downlink control channel, PDCCH, symbol within a slot.

17. The method of claim 3, wherein the minimum scheduling offset parameter is further based at least in part on a calculation of the minimum scheduling offset parameter, k, for the second BWP of the scheduled CC having the second SCS, $\mu_M$, according to:

$$K^{\mu_M} = \min\left(\max_{x \in X}\left(\left\lceil (K_{\mu_x} + \alpha)\frac{\mu_M}{\mu_x}\right\rceil\right), L\right),$$

where $K_{\mu_x}$ represents at least one of the first preferred value and the second preferred value; $\mu_x$ represents the first SCS of the scheduling CC; $\alpha$ represents a parameter based on a physical downlink control channel, PDCCH, monitoring case; X represents all numerologies included in the scheduling CC; and L representing a maximum allowed scheduling offset for the second BWP of the scheduled CC having the second SCS.

18. The method of claim 2, wherein the minimum scheduling offset parameter is further based at least in part on a maximum allowed scheduling offset value.

19. The method of claim 2, wherein receiving the configuration further comprises receiving the minimum scheduling offset parameter via radio resource control, RRC, signaling.

20. The method of claim 2, further comprising:
   receiving a cross-carrier scheduling; and
   receiving and/or transmitting signaling based at least in part on the cross-carrier scheduling and the minimum scheduling offset parameter.

21. The method of claim 1, wherein the minimum scheduling offset for the second BWP is based at least in part on maximum allowed minimum scheduling offset.

22. The method of claim 2, wherein the minimum scheduling offset for the second BWP is based at least in part on maximum allowed minimum scheduling offset.

\* \* \* \* \*